US008165518B2

(12) United States Patent
Smith et al.

(10) Patent No.: US 8,165,518 B2
(45) Date of Patent: *Apr. 24, 2012

(54) METHOD AND SYSTEM FOR KNOWLEDGE ASSESSMENT USING CONFIDENCE-BASED MEASUREMENT

(75) Inventors: Charles J. Smith, Encinitas, CA (US); Timothy M. Adams, Aurora, CO (US); Patrick G. Engstrom, Longmont, CO (US); Michael J. Cushman, Lakewood, CO (US); James E. Bruno, Los Angeles, CA (US); Ann Bruno, legal representative, Los Angeles, CA (US)

(73) Assignee: Knowledge Factor, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/908,303

(22) Filed: Oct. 20, 2010

(65) Prior Publication Data
US 2011/0151425 A1    Jun. 23, 2011

Related U.S. Application Data

(63) Continuation-in-part of application No. 10/398,625, filed as application No. PCT/US01/31633 on Oct. 4, 2001, now abandoned, application No. 12/908,303, which is a continuation-in-part of application No. 11/187,606, filed on Jul. 23, 2005, which is a continuation-in-part of application No. 10/115,157, filed on Apr. 3, 2002, now Pat. No. 6,921,268.

(60) Provisional application No. 60/237,789, filed on Oct. 4, 2000.

(51) Int. Cl.
G09B 11/00       (2006.01)

(52) U.S. Cl. .................. 434/350; 434/323; 434/236
(58) Field of Classification Search .................. 434/322, 434/323, 350, 365
See application file for complete search history.

(56) References Cited

U.S. PATENT DOCUMENTS
5,437,553 A    8/1995    Collins et al.
(Continued)

FOREIGN PATENT DOCUMENTS
WO    WO 00/19393    4/2000

OTHER PUBLICATIONS
"Knowing What They Know"; Webster, Brian; Pharmaceutical Executive Magazine; May 1, 2006.*
(Continued)

Primary Examiner — Kathleen Mosser
(74) Attorney, Agent, or Firm — Neugeboren O'Dowd PC

(57) ABSTRACT

A system for knowledge assessment and encouraging learning comprises transmitting to the a terminal a plurality of multiple choice questions and two-dimensional answers thereto, the answers including a plurality of full-confidence answers consisting of single-choice answers, a plurality of partial-confidence answers consisting of sets of multiple single-choice answers, and an unsure answer. The system further administers a confidence-based assessment (CBA) test that presents to the test subject the plurality of multiple choice questions directed to categorical topics, and the two-dimensional answers thereto, by which the test subject indicates both their substantive answer and the level of confidence category of their answer. The system compiles a knowledge profile from the scored CBA test, and encourages learning so that the user can address knowledge deficiencies as identified through the CBA test.

20 Claims, 8 Drawing Sheets

U.S. PATENT DOCUMENTS

| | | | |
|---|---|---|---|
| 5,577,919 | A | 11/1996 | Collins et al. |
| 5,618,182 | A | 4/1997 | Thomas |
| 5,810,605 | A | 9/1998 | Siefert |
| 5,904,485 | A | 5/1999 | Siefert |
| 6,039,575 | A | 3/2000 | L'Allier et al. |
| 6,422,869 | B1 | 7/2002 | Nagarajan et al. |
| 6,514,084 | B1 | 2/2003 | Thomas |
| 6,648,651 | B1 | 11/2003 | Cadman et al. |
| 6,652,283 | B1 | 11/2003 | Van Schaack et al. |
| 2003/0190592 | A1 | 10/2003 | Bruno et al. |
| 2011/0151425 | A1 | 6/2011 | Smith et al. |

OTHER PUBLICATIONS

Mosser, K.M., "Office Action re U.S. Appl. No. 10/398,625", Jun. 3, 2010, p. 12, Published in: US.

Mosser, K.M., "Office Action re U.S. Appl. No. 11/187,606", Jun. 4, 2010, p. 6, Published in: US.

Mosser, K.M., "Office Action re U.S. Appl. 10/398,625", Jul. 17, 2006, p. 8, Published in: US.

Mosser, K.M., "Office Action re U.S. Appl. 10/398,625", Sep. 15, 2009, p. 13, Published in: US.

Mosser, K.M., "Office Action re U.S. Appl. No. 11/187,606", Oct. 28, 2009, p. 6, Published in: US.

Mosser, K.W., "Office Action re U.S. Appl. No. 10/398,625", Dec. 3, 2008, p. 10, Published in: US.

Mosser, K.M., "Office Action re U.S. Appl. No. 11/187,606", Dec. 19, 2008, p. 10, Published in: US.

Oliver, M., "Innovation in the Evaluation of Learning Technology", "Learning and Teaching Innovation and Development", 1998, Publisher: University of North London, Published in: GB.

Stratford, Colin, "Supplementary European Search Report re U.S. Appl. No. PCT/US01/31633", Sep. 11, 2009, Published in: EP.

Pavel, M., et al., "(1995-96) Identifying and Addressing Information Deficits for Minority Undergraduate Students in Science", "Journal of Educational Technology Systems", , pp. 335-357, vol. 24, No. 4.

Craig, R.W., "Response to Oct. 28, 2009 Office Action re U.S. Appl. No. 11/187,606", Jan. 28, 2010, p. 16 Published in: US.

Craig, R.W., "Response to Dec. 3, 2008 Office Action re U.S. Appl. No. 10/398,625", Apr. 28, 2009, p. 18 Published in: US.

Craig, R.W., "Response to Jan. 10, 2007 Office Action re U.S. Appl. No. 10/398,625", May 14, 2007, p. 17 Published in: US.

Craig, R.W., "Response to Feb. 16, 2010 Office Action re U.S. Appl. No. 10/398,625", May 19, 2010, p. 17 Published in: US.

Craig, R.W., "Response to Dec. 19, 2008 Office Action re U.S. Appl. No. 11/187,606", Jun. 19, 2009, p. 14 Published in: US.

Craig, R.W., "Response to May 2, 2008 Office Action re U.S. Appl. No. 10/398,625", Sep. 2, 2008, p. 16 Published in: US.

Neugeboren, C., "Response to Jun. 4, 2010 Office Action re U.S. Appl. No. 11/187,606", Oct. 1, 2010, p. 12 Published in: US.

Craig, R.W., "Response to Jul. 17, 2006 Office Action re U.S. Appl. No. 10/398,625", Oct. 17, 2006, p. 20 Published in: US.

Craig, R.W., "Draft Response to Sep. 15, 2009 Office Action re U.S. Appl. No. 10/398,625", Oct. 23, 2009, p. 14, Published in: US.

Neugeboren, C., "Response to Jun. 3, 2010 Office Action re U.S. Appl. No. 10/398,625", Nov. 3, 2010, p. 7 Published in: US.

Craig, R.W., "Response to May 23, 2007 Advisory Action re U.S. Appl. No. 10/398,625", Dec. 7, 2007, p. 18, Published in: US.

Craig, R.W., "Response to Dec. 4, 2009 Advisory Action re U.S. Appl. No. 10/398,625", Dec. 15, 2009, p. 22.

Abedi, J., et al, "Test-Retest Reliability of Computer Based MCW-APM Test Scoring Methods", "Journal of Computer Based Instruction", 1989, pp. 29-35, vol. 16, No. 1, Published in: US.

Abedi, J. et al., "Concurrent Validity of the Information Referenced Testing Format Using MCW-APM Scoring Methods", "Journal of Computer-Based Instruction", 1993, pp. 21-25, vol. 20, No. 1, Published in: US.

Mosser, K.M., "Advisory Action Before the Filing of an Appeal Brief re U.S. Appl. No. 11/187,606", Feb. 16, 2010, p. 3 Published in: US.

Mosser, K.M., "Advisory Action Before the Filing of an Appeal Brief re U.S. Appl. No. 10/398,625", May 23, 2007, p. 3 Published in: US.

Mosser, K.M., "Advisory Action Before the Filing of an Appeal Brief re U.S. Appl. No. 10/398,625", Dec. 4, 2009, p. 3 Published in: US.

Craig, R.W., "Response to Sep. 15, 2009 Office Action re U.S. Appl. No. 10/398,625", Nov. 16, 2009, p. 18 Published in: US.

Bruno, James, "Use of Simulation for Examining the Effects of Guessing Upon Knowledge Assessment on Standardized Tests", "Conference Proceedings of the 10th Conference on Winter Simulation, Miami, FL", 1978, vol. 2, Publisher: IEEE Computer Society Press, Published in: US.

Bruno, James, "Admissible Probability Measures in Instructional Management", "Journal of Computer-Basedn Instruction, Winter 1987", pp. 23-30, vol. 14, No. 1.

Bruno, James E., "Modified Modified Confidence Weighted-Admissible Probability Measurement (MMCW-APM)", 1988.

Bruno, James E., "Monitoring the Academic Progress of Low-Achieving Students: An Analysis of Right-Wrong (R-W) Versus Information Referen", "Journal of Research and Development in Education, Summer 1989", , pp. 51-61, vol. 22, No. 4.

Bruno, J.E., "Using Testing to Provide Feedback to Support Instruction: A Reexamination of the Role of Assessment in Educational Orga", "Presentation at the NATO Advanced Research Workshop, Liege, Belgium, Oct. 26-30, 1992", , p. 8.

Bruno, J.E., et al., "Determining the Optimal Number of Alternatives to a Multiple-Choice Test Item: An Information Theoretic Perspective", "Educational and Psychological Measurement" p. 6.

EPO, "Statement in Accordance with the Notice from the European Patent Office Dated Oct. 1, 2007 Concerning Business Methods", "Official Journal of the European Patent Office, Munchen", Nov. 1, 2007, Published in: DE.

Mian, Ali, "Office Action in CA Application No. 2425166 ", Jul. 12, 2011, p. 3 Publisher: Canadian Patent Office, Published in: CA.

Cornwell, R., et al., "Perspective on Certainty-Based Marking: An Interview with Tony Gardner-Medwin", "nnovate", Feb. 5, 2008, p. 7 vol. 4, No. 3, Publisher: The Fischler School of Education and Human Services.

Stratford, Colin, "Office Action in EP Application No. 01979657.2", Oct. 18, 2010, p. 9 Publisher: European Patent Office, Published in: EP.

Gardner-Medwin, Tony, "Gaining Confidence in Confidence-Based Marking", "Abstract: Oxford Shock the Old, Jul. 4, 2005", , p. 18 Published in: GB.

Gardner-Medwin, Tony, "Gaining Confidence in Confidence-Based Assessment", "Shock of the Old", Apr. 2005, Publisher: University College London, Published in: GB.

University of Oxford, "The Shock of the Old 2005: Implementing Innovation", "Said Business School, Apr. 7, 2005", , p. 2.

Gardner-Medwin, A.R., "Certainty-Based Marking: rewarding good judgement of what is or is not reliable", "Abstract of Presentation at Innovation, Apr. 14-15, 2008, Breckenridge, CO", , Published in: US.

Gardner-Medwin, T., et al., "Self-Tests and Certainty Based Marking as Learning Tools—Putting Learners in Charge", "MoodleMook UK Apr. 14, 2010", , p. 15 Publisher: University College London, Published in: GB.

Gardner-Medwin, A.R., et al., "Do You Know What You Don't Know?", "Draft Article for UCL Newsletter, Apr. 1997", , Publisher: University College London, Published in: GB.

Gardner-Medwin, A.R., et al., "Formative and Summative Confidence-Based Assessment", "Proc. 7th International Computer-Aided Assessment Conference, Loughborough, UK, Jul. 2003", pp. 147-155, Publisher: www.caaconference.com, Published in: GB.

Gardner-Medwin, Tony, "Develop Understanding, with Self-Tests & Certainty Based Marking", "Presentation—Teaching and Learning Day Apr. 23, 2010", , Publisher: University of Leicester, Published in: GB.

Gardner-Medwin, A.R., "Updating with Confidence: Do your students know what they don't know?", "UCL Newsletter, May 1997, Health Informatics", , pp. 44-46, vol. 4, Published in: GB.

Gardner-Medwin, A.R., et al., "Certainty-Based Marking (CBM) for Reflective Learning and Proper Knowledge", "REAP07: Assessment Design for Lerner Responsibility Online Conference May 29-31, 2007", Publisher: Univs. of Strathclyde, Glasgow, Glasgow Caledonian.

Gardner-Medwin, A.R., "Enhancing Learning and Assessment Through Confidence-Based Marking", "Abstract accepted for a paper to the 1st International Conference on 'Enhancing Teaching and Learning through Assessment', Hong Kong Jun. 12-15, 2005".

Gardner-Medwin, Tony, "Marks for Identifying Uncertainty: Stimulation of Learning through Certainty-Based Marking", "Presentation: Cambridge Assessment", Jun. 2009, p. 35 Published in: GB.

Gardner-Medwin, Tony, "Improving Learning and Assessment with Confidence-Based Marking", "Abstract accepted for the HE Academy Meeting on Science Teaching & Learning, Warwick, Jun. 27-28, 2005", , Published in: GB.

Gardner-Medwin, A.R., "Confidence-Based Marking: encouraging rigour through assessment", "Abstract for the Physiological Society Teaching Workshop, Bristol, Jul. 2005", , Publisher: The Physiological Society, Published in: GB.

Gardner-Medwin, A.R., et al., "The Skill of Knowing How Reliable Your Knowledge Is", "The 13th Improving Student Learning Symposium, Imperial College, London, UK, Sep. 5-7, 2005", , Publisher: Improving Student Learning through Assessment, Published in: GB.

Gardner-Medwin, A.R., "Confidence Assessment in the Teaching of Physiology", "IUPS Workshop on Physiology Teaching", Sep. 1995, Publisher: Dept. Physiology, University College London, Published in: GB.

Gardner-Medwin, Tony, "Confidence Based-Marking—Think it Through", "The Newsletter of the Higher Education Academy Subject Centre for Medicine, Dentistry and Veterinary Medicine", Oct. 2005, pp. 26-29, vol. 1, No. 9.

Gardner-Medwin, Tony, "Is there a Measure of Knowledge?", "Nov. 21, 2006: Lunch Hour Lecture", , p. 12 Publisher: University College London, Published in: GB.

Gardner-Medwin, A.R., "Confidence Assessment in the Teaching of Basic Science", "Association for Learning Technology Journal (ALT-J)", 1995, pp. 80-85, vol. 3, Publisher: Dept. Physiology, University College London, Published in: GB.

Gardner-Medwin, A.R., "Rational and Irrational Marking Schemes", "Presentation to Physiological Society, Cardiff '98", p. 1.

Gardner-Medwin, A.R., "Dissemination of Confidence-Based Assessment", "Journal of Physiology", 2003, Publisher: Department of Physiology, University College London, Published in: GB.

Gardner-Medwin, A.R., "Confidence-Based Marking: Encouraging rigour through assessment", "Proceedings of the Physiological Society", 2005, Publisher: The Physiological Society, Published in: GB.

Gardner-Medwin, A.R., "Analysis of Exams Using Certainty-Based Marking", "Proceedings of the Physiological Society", 2006, Publisher: The Physiological Society, Published in: GB.

Gardner-Medwin, A.R., et al., "Certainty-Based Marking at UCL and Imperial College", "Proceedings of the Physiological Society", 2006, Publisher: The Physiological Society, Published in: GB.

Gardner-Medwin, Tony, "Perspectives on Assessment", 2006, p. 6 Published in: GB.

Gardner-Medwin, A.R., "Confidence-Based Marking—towards deeper learning and better exams", "Draft for Chapter 12 in Bryan C. And Clegg K. (eds) (2006) Innovative Assessment in Higher Education", 2006, Publisher: Routledge, Taylor and Fracis Group Ltd. London, Published in: GB.

"A.R. Gardner-Medwin—Teaching Publications", "page downloaded from Internet Oct. 14, 2010".

"LAPT: www.ucl.ac.uk/LAPT UCL Home of Certainty-Based Marking", "Page downloaded from Internet Oct. 13, 2010", , p. 3 Published in: GB.

Mosser, K.M., "Office Action re U.S. Appl. No. 10/398,625", Jan. 10, 2007, p. 8 Published in: US.

Mosser, K.M., "Office Action re U.S. Appl. No. 10/398,625", Feb. 16, 2010, p. 12 Published in: US.

Mosser, K.M., "Office Action U.S. Appl. No. 10/398,625", Mar. 24, 2011, p. 9 Published in: US.

Mosser, K.M., "Office Action re U.S. Appl. No. 10/398,625", May 2, 2008, p. 8 Published in: US.

Webster, Brian, "Knowing What They Know", "Reprinted from: Pharmaceutical Executive Magazine", May 1, 2006, p. 5.

* cited by examiner

3. The Panama Canal connecting the Atlantic and Pacific Oceans generally flows:
   A. North-South
   B. East-West
   C. Northeast-Southwest

| I AM SURE | I AM PARTIALLY SURE | I DON'T KNOW |
|---|---|---|
| Wrong = Maximum Penalty<br>Right = Maximum Reward | Wrong = Maximum Penalty<br>Right = Partial Reward | No Penalty<br>No Reward |
| ○ A  ○ B  ○ C | ○ A or B  ○ B or C  ○ A or C | ⦿ |

| MISTAKES | 25% | Q&A | |
| --- | --- | --- | --- |
| UNKNOWNS | 13% | Q&A | |
| DOUBTS | 25% | Q&A | |
| MASTERY | 38% | Q&A | |

FIG.7

| Question Explanation |
| --- |

Let your curiosity take control and have fun learning!

| Question |
| --- |

The Panama Canal connecting the Atlantic and Pacific Oceans generally flows:

| Your Answer |
| --- |

I Don't Know or Unanswered

| Correct Answer |
| --- |

A. North-South

| Explanation |
| --- |

The Panama Canal

Panama Canal (*Spanish Canal de Panama*), canal joining the Atlantic and Pacific oceans across the Isthmus of Panama. Running from Cristobal on Limon Bay, an arm of the Caribbean Sea, to Balboa, on the Gulf of Panama, the canal is slightly more than 64 km (40 ml) long, not including the dredged approach channels at either end. The minimum depth is 12.5 m (41 ft), and the minimum width is 91.5 m (300 ft). The construction of the Panama Canal ranks as one of the greatest engineering works of all time.

| Further Training Links |
| --- |

To learn more about Panama Canal at:
Panama Canal

To see the picture of Panama Canal:
Picture of Panama Canal

FIG.8

METHOD AND SYSTEM FOR KNOWLEDGE ASSESSMENT USING CONFIDENCE-BASED MEASUREMENT

PRIORITY AND RELATED APPLICATIONS

This Application is a Continuation-in-Part of U.S. patent application Ser. No. 10/398,625, filed on Sep. 23, 2003, which is a national stage entry application of PCT application number PCT/US01/31633, filed on Oct. 4, 2001, which claims the benefit of Provisional Patent Application Ser. No. 60/237,789 filed Oct. 4, 2000. The present application is also a Continuation-in-Part of U.S. patent application Ser. No. 11/187,606, filed on Jul. 23, 2005, which is a continuation in part of U.S. patent application Ser. No. 10/115,157, filed Apr. 3, 2002, now U.S. Pat. No. 6,921,268, which claims the benefit of PCT application number PCT/US01/31633, filed on Oct. 4, 2001, which claims the benefit of Provisional Patent Application Ser. No. 60/237,789 filed Oct. 4, 2000. This application claims the benefit of the above listed Patent Applications and the details of each of the above listed applications are hereby incorporated by reference into the present application by reference and for all proper purposes.

FIELD OF THE INVENTION

The present invention relates to knowledge assessment and learning and more particularly, to microprocessor and networked based testing and learning systems. The present invention also relates to knowledge testing and learning methods, and more particularly, to methods and systems for Confidence-Based Assessment ("CBA") and Confidence-Based Learning ("CBL"), in which one answer generates two metrics with regard to the individual's confidence and correctness in his or her response to facilitate an approach for immediate remediation.

BACKGROUND

Traditional multiple choice testing techniques to assess the extent of a person's knowledge in a subject matter include varying numbers of possible choices that are selectable by one-dimensional or right/wrong (RW) answers. A typical multiple choice test might include questions with three possible answers, where generally one of such answers can be eliminated by the test subject as incorrect as a matter of first impression. This gives rise to a significant probability that a guess on the remaining answers could result in a correct response. Under this situation, a successful guess would mask the true extent or the state of knowledge of the test subject, as to whether he or she is informed (i.e., confident with a correct response), misinformed (i.e., confident in the response, which response, however, is not correct) or being lacked of information (i.e., having no information). Accordingly, the traditional multiple choice one-dimensional testing technique is highly ineffectual as a means to measure the true extent of knowledge of the test subject. Despite this significant drawback, the traditional one-dimensional, multiple choice testing techniques are widely used by information-intensive and information-dependent organizations such as banking, insurance, utility companies, educational institutions and governmental agencies.

In response to the foregoing drawback, an information referenced testing technique was developed and pioneered by Dr. James Bruno of the University of California at Los Angeles. Information referenced testing ("IRT") techniques extract the test subject's information response and confidence associated with it, undertake to reduce guessing, and effect a scoring profile that is resistant to the affects of guessing. IRT test queries are generally represented in a two-dimensional format to incorporate two key components of recognition and confidence as part of the test questions or queries in a multiple choice test. The test example below illustrates the general principle of the IRT technique.

1. How many legs does a cat have?
  A. 3
  B. 4
  C. 5
2. What is the common logarithm of the number 3?
  A. 43
  B. 47
  C. 0.047
3. How many states border the state of New Mexico?
  A. 4
  B. 5
  C. 6
4. The Panama Canal connecting the Atlantic and Pacific Oceans generally runs
  A. North-South
  B. East-West
  C. Northeast-Southwest Instructions:

Each question has a predetermined point score of +30 if the answer is correct or −100 if the answer is incorrect.

If you can narrow your selection to two choices and eliminate the other choice as being an answer, mark your answer for the two choices: (A or B), (B or C), (A or C). Your response will be assigned a predetermined point score of +10 if the answer is correct or −100 if the answer is incorrect.

If you do not know the answer, you may choose not to respond, in which case, you will not receive any points.

When certain that an answer is correct, the test subject selects a response from one of the letters A, B, or C, which corresponds to the answer that the subject is confident to be correct. Thus the selection of a single letter indicates a high confidence level in the answer on the part of the test subject. If the response reflects the correct answer, a point score of 30 will be assigned. However, if the test subject selects one of the letters A, B, or C, which reflects a confidence in that response, a wrong answer for the response will return a score point of −100. This negative score point marks a state of misinformation and the subject is misinformed as to the substantive information pertaining to that query.

If the subject chooses not to select any of the letters provided, which indicates that he or she has no knowledge or information to provide a response, a zero score point will be returned.

Thus, with respect to the above sample queries, if the test subject answered the above questions 1-B, 2-? 3-BC, and 4-B the test subject would be considered as being informed, uninformed, part informed, and misinformed respectively on these test queries.

As illustrated above, the point scoring system of the IRT for correct and incorrect responses for the confidence levels reflected in the subject's answers are (a) +30,−100 when confident or sure; (b) +10,−100 when between two choices, and (c) 0,0 when the subject is without any information. Under the IRT protocol, a maximum score would be achieved if and only if the test subject is "honest" and does not overvalue his or her information. Thus any incentives to guess at an answer are significantly discounted.

Currently, use of the IRT techniques are on a case-by-case, or batch processing, with test creation, administration, scoring and reporting, which use requires significant human interface, labor and logistic support. More significantly is that informational or education material databases are generally disassociated with the results of the test performance and results interpretation thus impeding remedial actions to reeducate or retrain. The affects of such case-by-case application are further amplified where the tests are to be conducted at various locations.

Accordingly, there is a need for a robust and easily managed integral knowledge assessment and learning system, which is deployable in a distributed computer environment for developing and administering knowledge assessment across chronological and geographical bounds. Such a networked testing system would eliminate batch IRT processing, provide for a wider distribution of test subjects in organizations, ensure full confidentiality of the employee, and allow a more detailed and intelligent learning system which is geared toward the true information need of the user.

Traditional multiple choice, one-dimensional (right/wrong), testing techniques are forced-choice tests. This format requires individuals to choose one answer, whether they know the correct answer or not. If there are three possible answers, random choice will result in a 33% chance of scoring a correct answer. One-dimensional scoring algorithms usually reward guessing. Typically, wrong answers are scored as zero points, so that there is no difference in scoring between not answering at all and taking an unsuccessful guess. Since guessing sometimes results in correct answers, it is always better to guess than not to guess. It is known that a small number of traditional testing methods provide a negative score for wrong answers, but usually the algorithm is designed such that eliminating at least one answer shifts the odds in favor of guessing. So for all practical purposes, guessing is still rewarded.

In addition, one-dimensional testing techniques encourage individuals to become skilled at eliminating possible wrong answers and making best-guess determinations at correct answers. If individuals can eliminate one possible answer as incorrect, the odds of picking a correct answer reach 50%. In the case where 70% is passing, individuals with good guessing skills are only 20% away from passing grades, even if they know almost nothing. Thus, the one-dimensional testing format and its scoring algorithm shift the purpose of individuals, their motivation, away from self-assessment and receiving accurate feedback, toward inflating test scores to pass a threshold.

Confidence-Based Assessments, on the other hand, are designed to eliminate guessing and accurately assess people's true state of knowledge. In the 1980s, Dr. James Bruno pioneered information referenced testing (IRT) in direct response to the foregoing situation. IRT is a two dimensional (recognition and confidence) test scoring procedure that places less emphasis on restrictive response environments (students can indicate "I don't know"). The formative evaluation is in two parts. The first part is to provide feedback for student learning. The second is to provide feedback to provide support for instructional programs. Based on a decision theory model of testing rather than a psychometric model, IRT was found to be especially valuable, acceptable and applicable for individual student assessment. A number of studies were conducted throughout the late 1980s and early 1990s, and research papers were published in peer reviewed journals detailing the results. The IRT procedure then employed an objective, optically scan-able, partial credit type of test scoring system that measured accurate information, misinformation, lack of information and partial information in a student knowledge base. IRT has also been used extensively by the FAA, Nuclear Regulatory Agency, and major utility companies in areas where misinformation could have serious legal, political and social consequences. In the past, applications of the IRT concept have relied on paper score sheets and computers with optical scan capabilities.

The IRT approach was implemented as a Confidence-Based Assessment ("CBA") Testing System in the above-cited parent application Ser. No. 10/115,157, filed Apr. 3, 2002 which is incorporated into the present application by reference. This Confidence-Based Assessment approach is designed to eliminate guessing and accurately assess people's true state of knowledge. The CBA format covers three states of mind: confidence, doubt, and ignorance. Individuals are not forced to choose a specific answer, but rather they are free to choose one answer, two answers, or state that they do not know the answer. The CBA answer format more closely matches the states that test takers actually think and feel. Individuals quickly learn that guessing is penalized, and that it is better to admit doubts and ignorance than to feign confidence. Moreover, since CBA discourages guessing, test takers shift their focus from test-taking strategies and trying to inflate scores, toward honest, self-assessment of their actual knowledge and confidence. In fact, the more accurately and honestly individuals self-assess their own knowledge and feelings of confidence, the better their numerical scores.

Aspects of the present application refine the Confidence-Based Assessment approach by compiling a standard multiple choice test into a structured CBA. After individuals complete a CBA, their set of answers are used to generate a knowledge profile. The knowledge profile precisely segments answers into meaningful regions of knowledge, giving individuals and organizations rich feedback as to the areas and degrees of mistakes (misinformation), unknowns, doubts and mastery.

SUMMARY OF THE INVENTION

The present invention provides a method and system for knowledge assessment and learning, accurately assesses the true extent of a test subject's knowledge and provides learning or educational materials remedially to the subject according to identified areas of deficiency. The invention incorporates the use of information reference testing ("IRT") techniques and is deployable on a microprocessor based computing device or networked communication client-server system.

The assessment employs a non-one-dimensional technique to extract the knowledge and confidence level of the test subject, who is administered at least one query in the format of a non-one-dimensional query. The query is categorically answerable by confidence level and by substantive multiple-choice answers. The confidence categories are predefined as confidence levels between the range of 0% percent to 100% terms of selected levels with typical categories being "100% confident, or sure" "50% confident, or partially sure" and "unknown".

Responding to the responses of the test subject, the system compiles and scores the test subject's responses, and develops a knowledge profile. The knowledge profile includes an actual percentage score for the entire set of queries based on a weighted scoring protocol or scheme. Further, the knowledge profile includes a self-confidence percentage score for all queries considered by the subject as "sure" or "partially sure". The system also computes and presents a degree of misinformation or information gap.

The scores and the knowledge profile is presentable to the test subject or other system users. The presentation includes a display of the percentage of the responses of the test subject, scored and grouped according to distinct information quality regions. These regions include "misinformed, (answered 100% confident and incorrect or 50% confident and incorrect)"; "uninformed (answered unknown); partially informed (answered 50% confident and correct)"; and "fully informed (answered 100% confident and correct)".

The system further correlates the knowledge profile to a database of learning materials, which are organized and prioritized based on the identified informational needs of the test subject. The learning materials can be presented to a system user or the test subject for review and/or reeducation thereby ensuring the subject's acquisition of the true knowledge and accurate information in a cost-effective manner. These materials include detailed correct substantive answers with explanation. Additionally, the system provides direct-linked access to other sources of learning materials or information depositories via the Internet.

The present invention is adapted for deployment in a microprocessor-based standalone computing device, for individual and network-distributed in a client-server environment of a communication network. The system incorporates various user-interfaces, software scripts, web browser dialog controls and other software and hardware support means for query construction, user inputs, data collection, reduction and storage, system management, reporting, and learning or training support. The invention further provides input facilities and editorial supports for test construction and accommodates various test queries without regard to the specific nature of the information or knowledge on which the assessment is administered.

In accordance with another aspect, a Confidence-Based Assessment (CBA) approach compiles a standard three answer ("A", "B", and "C") multiple choice test into a structured CBA format with seven possible answers that cover three states of mind: confidence, doubt, and ignorance to more closely match the state of mind of the test taker.

In accordance with another aspect, a CBA scoring algorithm gives maximum points for confidently held correct answers, partial points for unsure correct answers, no score for not knowing, and a maximum penalty for wrong answers. Individuals quickly learn that guessing is penalized, and that it is better to admit doubts and ignorance than to feign confidence.

In accordance with another aspect, guessing is discouraged by encouraging test takers to shift their focus from test-taking strategies and trying to inflate scores, toward honest, self-assessment of their actual knowledge and confidence. In fact, the more accurately and honestly individuals self-assess their own knowledge and feelings of confidence, the better their numerical scores.

In accordance with another aspect, an assessment method includes a CBA set of answers separated into quadrants, whereby each set of results is displayed as a knowledge profile made up of a mastery score, a mastery gap (or information gap), and a confidence gap, to more precisely segment answers into meaningful regions of knowledge, giving individuals and organizations rich feedback as to the areas and degrees of mistakes (misinformation), unknowns, doubts and mastery.

In one embodiment, a method for knowledge assessment and encouraging learning, comprises the administering of a confidence-based assessment (CBA) test comprising a plurality of multiple choice questions directed to categorical topics, and two-dimensional answers by which a subject indicates both their answer and level of confidence category of their answer. The answers include a plurality of full-confidence choices consisting of single-choice answers (A), (B) or (C), a plurality of partial-confidence choices consisting of sets of multiple single-choice answers (A or B), (B or C), (A or C), and an unsure answer. The method includes scoring the CBA test by giving maximum points for correct full-confidence answers, partial points for correct partial-confidence answers, no score for not knowing, and a maximum penalty for wrong answers in any category. The answers are compiled and displayed as a knowledge profile to the subject that includes a graphical illustration arranged with correctness of the answer along one axis and confidence in the answer another axis, and further separated into quadrants of doubt, misinformation, unknown and mastery. In addition to the graphical knowledge profile, a numerical scoring profile is derived and displayed to the subject as percentage of answers assigned to each quadrant.

Once the CBA test is administered, the results compiled, and feedback given, the present method encourages remedial learning by displaying (in association with the knowledge profile) all multiple choice questions along with the subject's answer, the correct answer, an explanation, and references to related learning materials for the questions.

The foregoing CBA test method is re-administered, and when taken multiple times a composite knowledge profile is compiled and to the subject to show improvement. This approach gives both the subject and the administering organization rich feedback as to the areas and degrees of mistakes (misinformation), unknowns, doubts and mastery. Confidence-Based Learning ("CBL") is the combined functionality that includes the CBA along with the learning as so described.

BRIEF DESCRIPTION OF THE DRAWINGS

FIG. 7 is a perspective graphical illustration of an exemplary Knowledge Profile indicating quadrant percentages in response to answers, with hyper links to Questions & Answers (Q&A);

FIG. 8 is a screen print of an exemplary remediation presentation;

BRIEF DESCRIPTION OF THE CODE APPENDIX

Detailed Description

The present invention provides a method and system for conducting knowledge assessment and learning. The invention incorporates the use of information reference testing and learning techniques deployable on a micro-processor-based or networked communication client-server system, which extracts knowledge-based and confidence-based information from a test subject. The assessment incorporates non-one-dimensional techniques.

The invention produces a knowledge profile, which includes formative and summative evaluation for the system user and identifies various knowledge quality levels. Based on such information, the system correlates the knowledge profile to a database of learning materials, which is communicated to the system user or test subject for review and/or reeducation of the substantive response.

The invention interactively accommodates various aspects of test administration and learning by a system user including storage of information and learning materials, test or query creation, editing, scoring, reporting and learning support without regard to the specific nature of the information on which the test subject is tested.

The present invention is adaptable for deployment on a standalone personal computer system. In addition, it is also deployable in a computer network environment such as the World Wide Web, or an intranet client-server system, in which, the "client" is generally represented by a computing device adapted to access the shared network resources provided by another computing device, the server.

Figure 1:
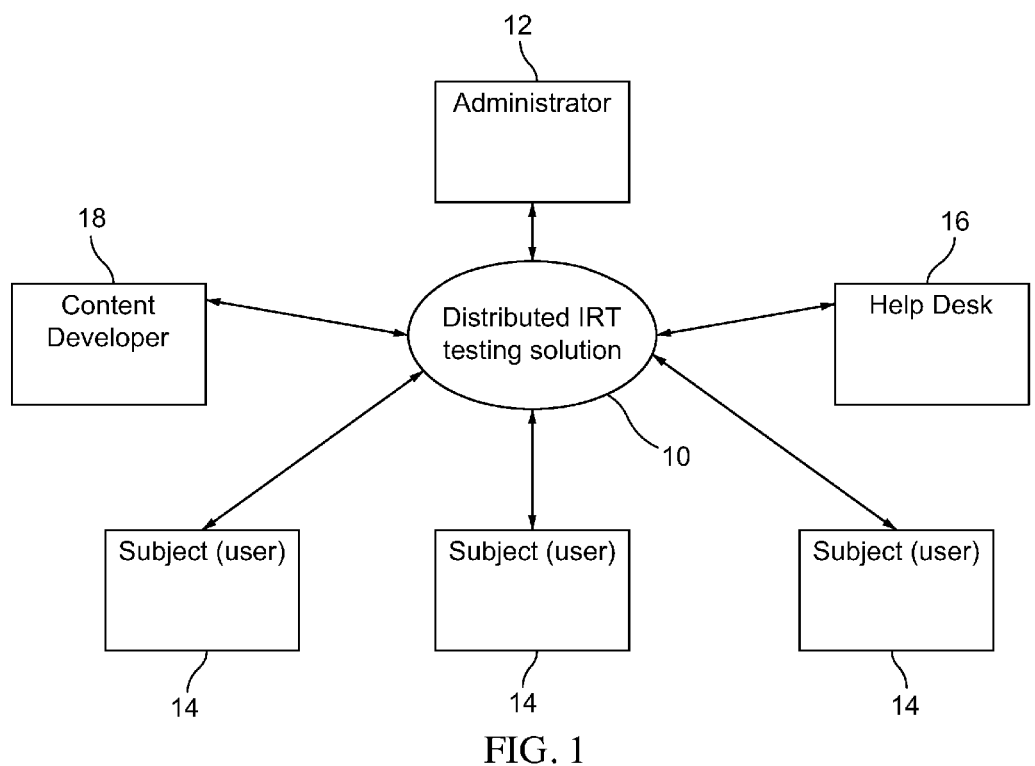
FIG. 1 is a conceptual design diagram showing the various participants to and interaction of the knowledge and misinformation testing and learning system according to aspects of the present invention.

As shown in FIG. 1, the knowledge assessment method and learning system [8] of the present invention provides distributed information reference testing and learning solution [10] to serve the interactive needs of its users. Any number of users may perform one function or fill one role only while a single user may perform several functions or fill many roles. For example, a system administrator [12] may perform test assessment management, confirm the authenticity of the users [14], deliver the test queries to multiple users [14] who may includes test subjects, (by password, fingerprint data or the like), and monitor the test session for regularity, assessment and feedback. Likewise, the system users [14] provide authentication to the administrator [12] and take the test. A help desk [16], which might be stationed by appropriate personnel, is available to the users [14] for any problems that might arise. A content developer [18], or test author, designs and produces the test content and/or associated learning content.

Although aspects of the present invention are adaptable for a variety of assessment, evaluation, testing and learning applications, it will herein be described in the context of a distributed learning environment.

Figure 2:
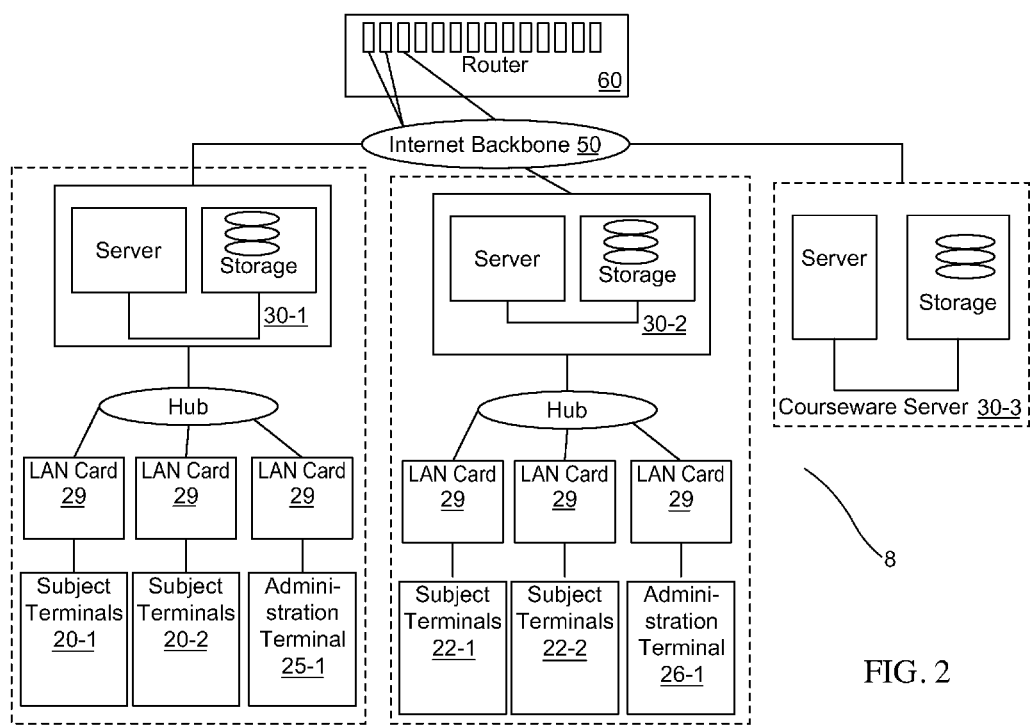
FIG. 2 is a perspective drawing of an exemplary computer network architecture that supports the method and system of aspects of the present invention.
Figure 3:
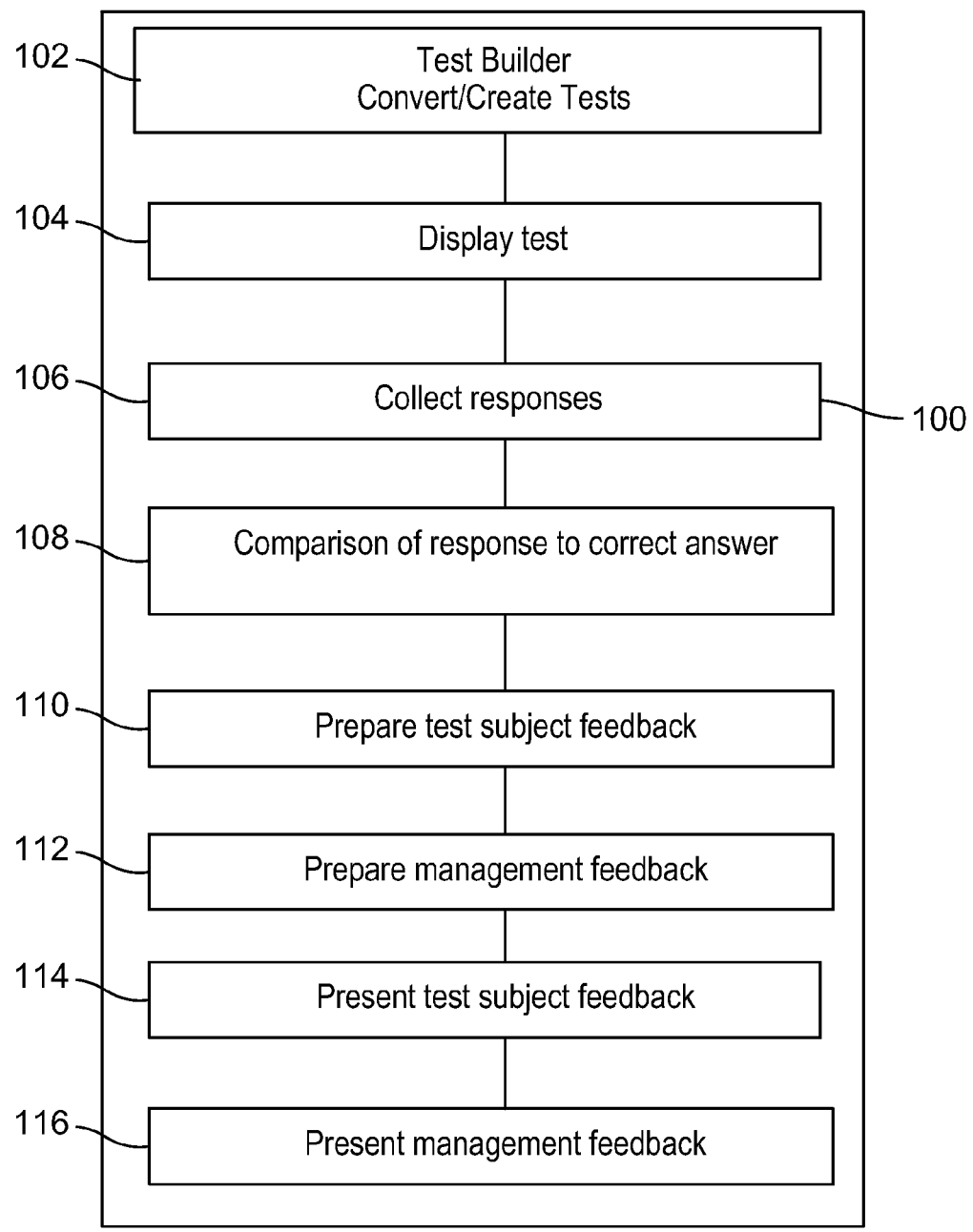
FIG. 3 is a logical block diagram of an embodiment of a testing and reporting structure according to aspects of the present invention.

As shown in FIG. 2, the present invention comprises a computer network architecture to effect the distribution of the knowledge assessment and learning functions, and generally encompasses the various functional steps, as represented by logical block 100 in FIG. 3. Knowledge assessment queries or questions are administered to the test subjects of each registered organization through a plurality of subject terminals 20-1, 2 . . . n, and 22-1, 2 . . . n. One or more administrator terminals 25-1, 26-1 are provided for administering the tests from the respective organizations. Each subject terminal 20, 22 and Administrator Terminal 25, 26 is shown as a computer workstation that is remotely located for convenient access by the test subjects and the administrator(s), respectively. Communication is effected by computer video screen displays, input devices such as key board, touch pads, "game pads," mobile devices, mouse, and other devices as known in the art. Each subject terminal 20, 22 and administrator Terminal 25, 26 preferably employs sufficient processing power to deliver a mix of audio, video, graphics, virtual reality, documents, and data.

Groups of test subject terminals 20, 22 and administrator terminals 25, 26 are connected to one or more network servers 30 via network hubs 40. Servers 30 are equipped with storage facilities such as RAID memory to serve as a repository for subject records and test results.

As seen in FIG. 2, local servers 30-1, 30-2 are connected in communication to each other and to a courseware server 30-3. As illustration of the system's remote operability, the server connections are made through an Internet backbone 50 by conventional Router 60. Information transferred via Internet backbone 50 is implemented via industry standards including the Transmission Control Protoc01lInternet Protocol ("TCP/IP").

Courseware, or software dedicated to education and training and administrative support software are stored and maintained on courseware server 30-3 and preferably conforms to an industry standard for distributed learning model (the ADL initiative), such as the Aviation Industry CBT Committee (AICC) or Sharable Content Object Reference Model (SCORM) for courseware objects that can be shared across systems. Courseware server 30-3 supports and implements the software solution of the present invention, including the functional steps as illustrated in FIG. 3. The software can be run on subject terminals 20, 22, which is subject to the independent controlled by an administrator. The system 8 provides electronic storage facilities for various databases to accommodate the storage and retrieval of educational and learning materials, test contents and performance and administration-related information.

In operation, any remotely located test subject can communicate via a subject terminal 20, 22 with any administrator on an administrator terminal. The system 8 and its software provides a number of web-based pages and forms, as part of the communication interface between a user (including system administrator 12, test subject 14 and test content developer 18) and the system to enable quick and easy navigation through the knowledge assessment process. A Web-based, browser-supported home page of the knowledge assessment and learning system of the present invention is presented to the system user, which serves as a gateway for a user to access the system's Web site and its related contents. The homepage includes a member (user) sign-in menu bar, incorporating necessary computer script for system access and user authentication. For illustrative purposes, the term "member," is sometimes synonymously referred herein as "user."

A member sign-in prompts system 8 to effect authentication of the user's identify and authorized access level, as generally done in the art.

The present invention provides a computer software-based means or test builder module 102 by which a user, such as a test administrator or a test content developer can construct a test.

For purposes of illustration, the test construction or building will herein be described with reference to a sample test that is accessible via the homepage with a "Build" option. The selection of this "Build" option leads to a test builder screen. The Test Builder main screen incorporates navigational buttons or other means to access the major aspects of test formulation. The test builder screen includes several functional software scripts in support of administrative tasks, such as accounting and user authentication, test creation, edit and upload, review of users' feedback statistics and provides a user's interface with system 8 for creating a new test. For purposes of discussion herein the test builder screen is also called "Create New Test Screen."

Upon authentication of the user, system 8 leads the user to the test builder screen. The test builder screen prompts the user to fill in text boxes for information such as test identification, test name, and author identity, and initializes the test building module. Upon test initialization, the system provides the user with options for the input of test contents, by way of test creation, edition of existing test, upon test and or images.

System 8 further provides editorial and formatting support facilities in Hypertext Mark-Up Language ("HTML") and other browser/software language to include font, size and color display for text and image displays. In addition, system 8 provides hyperlink support to associate images with questions and queries with educational materials.

As mentioned above, system 8 is adapted to allow the user to upload a rich-text format file for use in importing an entire test or portion thereof using the a number of Web-based pages and forms, as part of the communication interface between the user and the system. In addition, test builder module 102 is also adapted to receive an image file in various commonly used formats such as *.GIF and *.JPEG. This feature is advantageous as in the case where a test query requires an audio, visual and/or multi-media cue. Text and image uploading to the system is accomplished by the user activating a script or other means incorporated as part of the user interface or screen image. As part of the test builder ("Create New Test") screen, a hyperlink is provided on the screen image, which activates a system script to effect the file transfer function via conventional file transfer protocols.

Test builder module 102 allows test authors to convert their existing tests or create new tests in the appropriate format. A test author inputs a question or query and a plurality of potential answers. Each question must have a designated answer as the correct choice and the other two answers are presumed to be wrong or misinformed responses. In the example as shown, each of the queries has three possible choices.

Once the body of a test has been constructed using the input facilities incorporated as part of the web pages presented to the User, test builder 102 configures the one-dimensional right-wrong answers to non-one dimensional answer format. Thus, in one embodiment of the present invention in which a query has three possible answers, a non-one-dimensional test, in the form of a two-dimensional answer is configured according to predefined confidence categories or levels. Three levels of confidence categories are provided, which are designated as: 100% sure (selects only one answer); 50% certain (select a pair of choices that best represents the answer (A or B) (B or C), or (A or C); and Unknown. For the 50% certain category, the answers are divided up into possible combination of pairs of choices (A or B) (B or C), or (A or C). The entire test is arranged with each query assigned by system 8 to a specified numbered question field and each answer assigned to a specified lettered answer field. The queries, confidence categories and the associated choices of possible answers are then organized and formatted in a manner that is adaptable for display on the user's terminal. Each possible choice of an answer is further associated with input means such as a point-and-click button to accept an input from the test subject as an indication of a response to his or her selection of an answer. In one embodiment of the present invention, the presentation of the test queries, confidence categories and answers are supported by commonly used Internet-based browsers. The input means can be shown as separate point-and-click buttons adjacent each possible choice of answer. Alternatively, the input means can be embedded as part of the answer choice display, which is activated when the test subject points and clicks on the answer.

As, seen from the above discussion, the present system substantially facilities the construction of non-one-dimensional queries or the conversion of traditional one-dimensional or "RW" queries. The test and learning building function of the present invention is "blind" to the nature of the test materials on which the test is constructed. For each query or question, the system would only need to act upon the form of the test query but not its contents; possible answers and correct answer; and the answer choice selected by the test subject.

Test builder 102 also allows a user to link each query to specific learning materials or information pertaining to that query. The materials are stored by the system, providing ready access to the user as references for text construction. They also form a database to which the test subject is directed for further training or reeducation based on the performance of the knowledge assessment administered to the test subject. These learning materials include text, animations, audio, video, web pages, and IPIX camera and similar sources of training materials. An import function as part of the test builder function is provided to accept these linked materials into the system.

Presentation of the knowledge assessment queries or tests to the test subject is initiated by a "Display Test" or display test module 104. Supported by a computer script, display test module 104 includes administrative functions for authentication of each test subject, notification of assessment session and for the retrieval of the queries from the system for visual presentation to the test subject. Optionally, the queries may be presented in hypertext or other software language formats linkable by appropriate Uniform Resource Locators ("URL's"), as the administrator may determine, to a database of learning materials or courseware stored in system 8 or to other resources or Web sites.

As mentioned above, knowledge assessment of a test subject is initiated by the presentation of the number of non-one-dimensional queries to the test subject. Each of these queries is answerable as a response to a substantive multi-choice answer selectable from a predefined confidence category.

As an example of the embodiment of the present invention, the test queries or questions would consist of three answer choices and a two-dimensional answering pattern that includes the test subject's response and his or her confidence category in that choice. The confidence categories are: "I am sure," "I am partially sure," and "I don't know." A query without any response is deemed as, and defaults to, the "I don't know" choice.

The knowledge assessment of the present invention can be administered to separate test subjects at different geographical locations and at different time periods. In addition, the Knowledge assessment can be administered in real time, with test queries presented to the test subject. The entire set of test queries can be downloaded in bulk to a test subject's workstation, where the queries are answered in their entirety before the responses are communicated (uploaded) to the courseware server of system 8. Alternatively, the test queries can be presented one at a time with each query answered, whereupon the test subject's response is communicated to the courseware server. Both methods for administering the knowledge assessment can optionally be accompanied by a software script or subroutine residing in the workstation or at the courseware server to effect a measurement of the amount of time for the subject to respond to any or all of the test queries presented. When so adapted, the time measuring script or subroutine functions as a time marker. In an exemplary embodiment of the present invention, the electronics time marker identifies the time for the transmission of the test query by the courseware server to the test subject and the time when a response to the answer is returned to the server by the test subject. Comparison of these two time markings yield the amount of time for the subject to review and respond to the test query.

When all queries have been answered, a "score your test" function is invoked, as by way of the test subject clicking a "Score Your Test" button bar on the subject's workstation terminal or input device, which terminates the knowledge assessment session. System 8 initializes the operation of "Collect Responses" or collect responses module 106, which comprises computer software routine, to collect the test subject's responses to the test queries. These responses are then organized and securely stored in a database of collected responses associated with system 8.

Thereafter, a scoring engine or comparison of responses module 108 ("Comparison of Responses") is invoked to perform a "Comparison of responses to correct answer" on the subject's responses with the designated correct answers on which a gross score is calculated.

As discussed above, the present invention adopts a scoring protocol, by which the test subject's responses or answers are compiled using a predefined weighted scoring scheme. This weighted scoring protocol assigns predefined point scores to the test subject for correct responses that are associated with an indication of a high confidence level by the test subject. Such point scores are referred herein as true knowledge points, which would reflect the extent of the test subject's true knowledge in the subject matter of the test query.

Conversely, the scoring protocol assigns negative point scores or penalties to the test subject for incorrect responses that are associated with an indication of a high confidence level. The negative point score or penalty has a predetermined value that is significantly greater than knowledge points for the same test query. Such penalties are referred herein as misinformation points which would indicate that the test subject is misinformed of the matter.

The present inventive method and system for knowledge assessment neither rewards nor penalizes the test subject recognizing not knowing the answer for any test query. Accordingly, the scoring protocol does not assign nor deduct any point score for that particular query.

The scoring protocol assigns partial credit where the test subject is reasonably sure (for example 50% certain) of the answer, as indicated by the test subject selecting more than one answer or by eliminating one or more answer where the subject considers as wrong. However, the test subject is also significant penalized in point score, relative to the point scores for a wrong answer where the test subject has indicated a reasonable confidence in the subject matter pertaining to the response.

As an example, in an assessment where there are three predefined confidence categories or levels, "100% confidence", "50% confidence", and "Don't know," the scoring levels are represented by four levels or regions of information or knowledge quality: (1) Fully informed, +30; (2) Partially informed, +10; (3) Uninformed, 0; and (4) Misinformed, −100. As indicated, these scoring levels are accompanied by award or penalty points, which are also predefined by the test administrator as part of the assessment protocol to encourage a response that accurately reflect the test subject's perceived confidence level associated with his or her response.

As exemplified above, for any given test query, the designated point score for a fully informed response is greater than the score point for a partially informed response. Where the test subject provides a "Don't know" response, no point score is awarded. To discourage guessing, as may be the case where the test subject has provided an incorrect response while indicating "100% confidence," a negative point score is assigned with a value that is significantly greater than the point score awarded to either a fully informed or partially informed score. Thus though the reward and penalty point scores have been provided above, they serve to illustrate the advantage of the present invention in discouraging guessing. In another embodiment of the present invention, the point score for a correct answer is generally selectable between the range of 20-50 (+20 to +50) point and the penalty point scores for a wrong answer is generally selectable between the range of minus 80 to minus 150 (−80 to −150) points.

Accordingly, the ratio of the absolute values of the reward point scores for a correct answer to the penalty point scores for a wrong answer is between approximately 13.3% to 62.5%. The determination of the values of the reward point scores and the penalty point scores is made as an administrative decision, which may depend on a variety of considerations including but not limited to the business and economic consequences associated with a right or wrong information-depending response. However, the scoring levels of +30 points for a fully informed correct answer and a minus 100 point score for a partially informed or misinformed answer have shown applicability in addressing a wide spectrum of knowledge assessment needs.

The raw scores include a one-dimensional right/wrong score, which represents an actual percentage score the test subject achieved for the entire test, and a self-confidence percentage score that the test subject had thought to have achieved. This "self-confidence" score is based on the results that would have been produced if the test subject's answers were correct for all test queries selected from the "sure" and "partially sure" confidence categories. The difference between the actual score and the "self-confidence" score indicates the degree of misinformation, which could be indicative of the subject's ability to respond to situations where information is needed.

The point scores are passed to a scoring module 108, which calculates the test subject's raw score, as well as other various other performance indices. System 8 further includes a "Prepare Test Subject feedback" module 110, which prepares such the performance data and prepare them to the test subject via a "Prepare Test Subject Feedback" module 114. In a similar manner, a "Prepare Management Feedback" module 112 prepares the subject's performance data and prepare them to the test administrator via the "Management Feedback Module" 116. In one embodiment of the present invention, these score components include raw score, a knowledge profile; aggregate score knowledge profile expressed as a percent score; self-confidence score; misinformation Gap; personal training plan; knowledge index; and performance rating.

The knowledge profile is characterized as a percentage of correct responses for each of the knowledge or information quality regions, for example, misinformed, uninformed, partially informed, and fully informed. For the example as discussed above, based on the raw scores, the percentages of correct responses are mapped onto the knowledge quality regions. The quality regions include misinformed (answered 100% confident and incorrect or 50% confident and incorrect); uninformed (answered unknown); partially informed (answered 50% confident and correct); and fully informed (answered 100% confident and correct), which are shown with hypothetical percentage scores as follows:

Misinformed: 10% (answered "} Am Sure" once and incorrect)

Uninformed: 10% (answered "Unknown" three times;)

Partially informed: 20% (answered "I Am Partially Sure" four times)

Fully informed: 60% (answered "I Am Sure" five times and correct).

The aggregate score can also be computed as an alternative expression of the knowledge profile expressed as a percentage by using the formula:

Aggregate Score=((100*$NQ$)+Score))/(130*$NQ$);

Where NQ=Number of queries on the test; and
Score=Raw test score based on the values of:
Fully informed=+30
Partially informed=+10
Uninformed=0; and
Misinformed=−100

"*" denotes the multiplication sign.

Formula (1) represents the percent of "actual" information possessed by the test subject to the maximum score possible. To the extent that the raw (weighted) score is affected by the penalty resulted from a test subject's "misinformed" answers or responses, calculation of the aggregate score is compensated or scaled by a value that is attributable to the possible penalty points for all the queries. For the example referenced above, in which a "misinformed" score is assigned a penalty of minus 100 points, the compensation or scaling has a value of 100 times the number of queries, or 100*NQ. (The "*" denotes the multiplication sign.) Thus, a test subject's "actual" information, the aggregate score, would be reflected quantitatively as (100*NQ)+the raw score. The scaling also results in a maximum score of (100*NQ+30*NQ) or 130*NQ, which is applied as the denominator of Formula 1 against which the "actual" information is weighted.

Figures 5, 6:
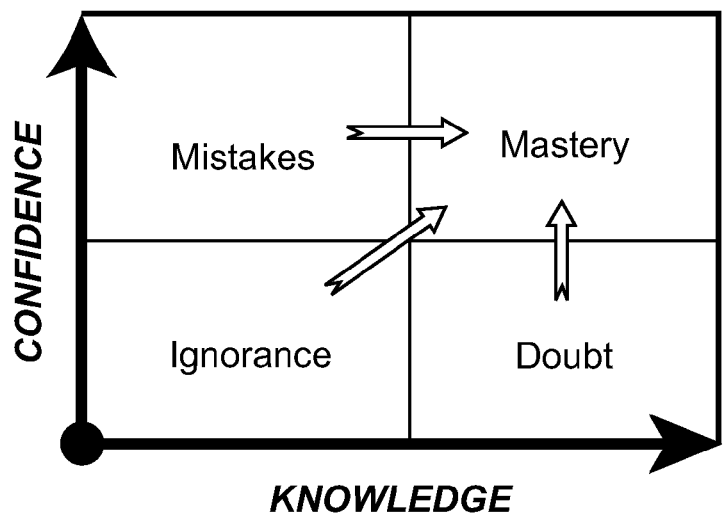
FIG. 5 is a screen print illustrating a Question & Answer Format with seven response options according to aspects of the present invention.
FIG. 6 is a perspective graphical illustration of the four Knowledge Quadrants indicating confidence and knowledge grid according to aspects of the present invention.

The point scores of the present invention is derived by using a log function, which is expressed in the form: Score=A*log P (sub i)+B. P (sub i) reflects the probability of a correct response given the confidence levels expressed by a test subject in providing a response to a query. As shown in FIG. 5, P (sub i) has a numerical value between the range of 0%, which reflects the test subject's complete lack of confidence in achieving a correct answer, a state of being misinformed, and 100%, which indicates the subject's full confidence in achieving a correct answer, a state of being fully informed. A and B are scaling constants, which are applied to the log function to define a range of point scores projected over the probability or the test subject's confidence in achieving a correct answer between 0 and 100% as shown in FIG. 5. By adjusting the A and B scaling constants, the range of the point scores can extend over a wide range of values. For the example in the present invention, the range of point scores between +20 and −150 has shown a high degree of ease of application.

A significant aspect of the present invention is that the scoring system is validated by the degree to which it is "reproducible". That is, the maximum score occurs when one does not guess, but uses their information wisely. As applied to a multiple-choice query in which three possible choices are presented and the likelihood of guessing a right answer is one out of three, the scoring protocol of the present invention neither rewards nor penalizes a choice where the test subject has a of 33% confidence in choosing the right answer. Thus, regardless of whether the test subject can choose a right or wrong answer as a response, the scoring system of the present invention would assign a score of zero where the test subject is "uninformed" of the response or answer to the query. In the example of the present invention where there are three possible choices of an answer to a query, a zero point score is assigned to a probability of 33%, which is also a statistical likelihood with which the test subject can achieve an uniformed but correct answer. Such a random choice of one of the three possible answers would also correspond to an expression of "I don't know" expressed by the test subject for a lack of information or confidence with respect to any choice.

As referenced above, A and B are scaling constants, which are applied to the log function to define the individual point scores associated with the probability of a correct response given the confidence expressed by a test subject in providing a response to a query. In the examples as referenced above, the A and B scaling constants were applied to the log function, with P (sub i=1) of 0.0; P (sub i=2) of 0.33; P (sub i=3) of 0.50; and P (sub i=4) of 1.00), to result in the respective approximate point scores of −100; 0; +10 and +30, that is, a value of −100 (for a 0 probability), 0 (for a 33% probability), +10 (for a 50% probability) and +30 (for 100% probability Depending on the values of A and B, the range of the point scores can vary. For the example in the present invention, the values of A and B were chosen to result in a scoring system having point scores between the range of 20 to 50 (+20 to +50) point for a fully informed answer and between the range of minus 80 to minus 150 (−80 to −150) point for a misinformed answer.

Thus from the above, it is apparent that the scoring protocol or system of the present invention can substantially reduce the effect of guessing. Further, compared with other scoring systems, which are often extremely complicated to remember thus not proving effective in actual classroom use, the present invention incorporates a scoring system in which the values of the points would approximate the value of 10 or its multiples. Thus the scoring system is easily communicated to the test subjects or users and is much easier to remember.

The self-confidence score is represented by the overall percentage score the test subject would have received if his or her responses were correct for all test queries where a high level of self-confidence is indicated. A high level of self-confidence is indicated when a query response is entered in the "I am sure" or "I am partially sure" categories, as indicative of the test subject's perception as to the confidence level in state of knowledge in himself or herself. On the other hand, a misinformation gap is quantified by system 8, which is represented by the difference between the aggregate score and the self-confidence score.

As part of the feedback, system 8 organizes the test queries, which are presented to the test subject or other system users based on the knowledge quality regions. System 8 uses the stored information created in module 102 that identifies specific curriculum for each question to create hyperlinks to that curriculum thus configuring a personal learning plan in relation to the quality regions. Thus, as soon as the test scores are calculated, the test subject or the system user will be able to identify the area of information deficiencies where remedial actions are indicated.

System 8 also provides the computation of a knowledge index, which is presented to the user on demand via the management feedback module 112. The knowledge index is based on the aggregate score as part of the knowledge profile, in which the aggregate score is correlated to seven levels of understanding to the learning materials on which the test is based. The seven levels are:

| | |
|---|---|
| 100 | Excellent |
| 92-99 | Very Good - Minor review would be helpful |
| 86-91 | Good - Would benefit from thorough review |
| 77-85 | Fair - Needs further instruction |
| 76 | Minimum Knowledge - Requires significant instruction |
| 69-75 | Poor - Requires re-education on why the information is incorrect |
| 0-68 | Failed - Not qualified |

In addition to the above, the present invention computes a performance rating, which is computed and presentable as part of the management feedback module 112, which might be used to predict a test subject's ability to correctly perform the information-related or information-dependent tasks. This matrix displays the degree of confidence a test subject has in correct information according to the following formula.

If the aggregate score is approximately 0.69 or above then

Performance Rating, $XX=B4*Y**4+B3*Y**3+B2*Y**2+B1*Y**$ (12);

Where Y=Aggregate Score
B4=−29.408665
B3=78.467215
B2=−66.855877
B1=18.799063

If the aggregate score is less than 0.69 then
$XX=0.36*Y$

"**" denotes an exponent or power.

The performance rating as shown in Formula 2 and 2a represents the probability with which a test subject would provide a correct answer by way of an informed response, which is calculated as function of the aggregate score, as expressed in Formula (1). Formula 2 and 2a are derived by applying an anti-log of the log function as expressed in Formula 1. Where the value of the aggregate score is approximately 0.69, that is 69% or greater, the performance index is expressed as a polynomial as shown in Formula 2. Though the coefficients, B1, B2, B3 and B4 are precisely quantified to exemplify the result of the application of the anti-log, variations in their values by as much as 10% could also yield acceptable result in assessing the probability with which the test subject can provide an informed answer. Where the test subject's aggregate score is less than 0.69 or 69%, the performance rating can be linearly approximated and expressed by Formula 2a. The performance rating expression thus represents an overall assessment of the confidence that a test subject is informed of the substantive answers for a particular set of queries.

Once the performance rating has been calculated, the results can be correlated to various levels of performance, as exemplified by the following scale:

| | |
|---|---|
| 75%-100% | Exceptional |
| 50%-74% | Accurate |
| 34%-49% | Marginal |
| 0%-33% | Unqualified |

Figure 11:
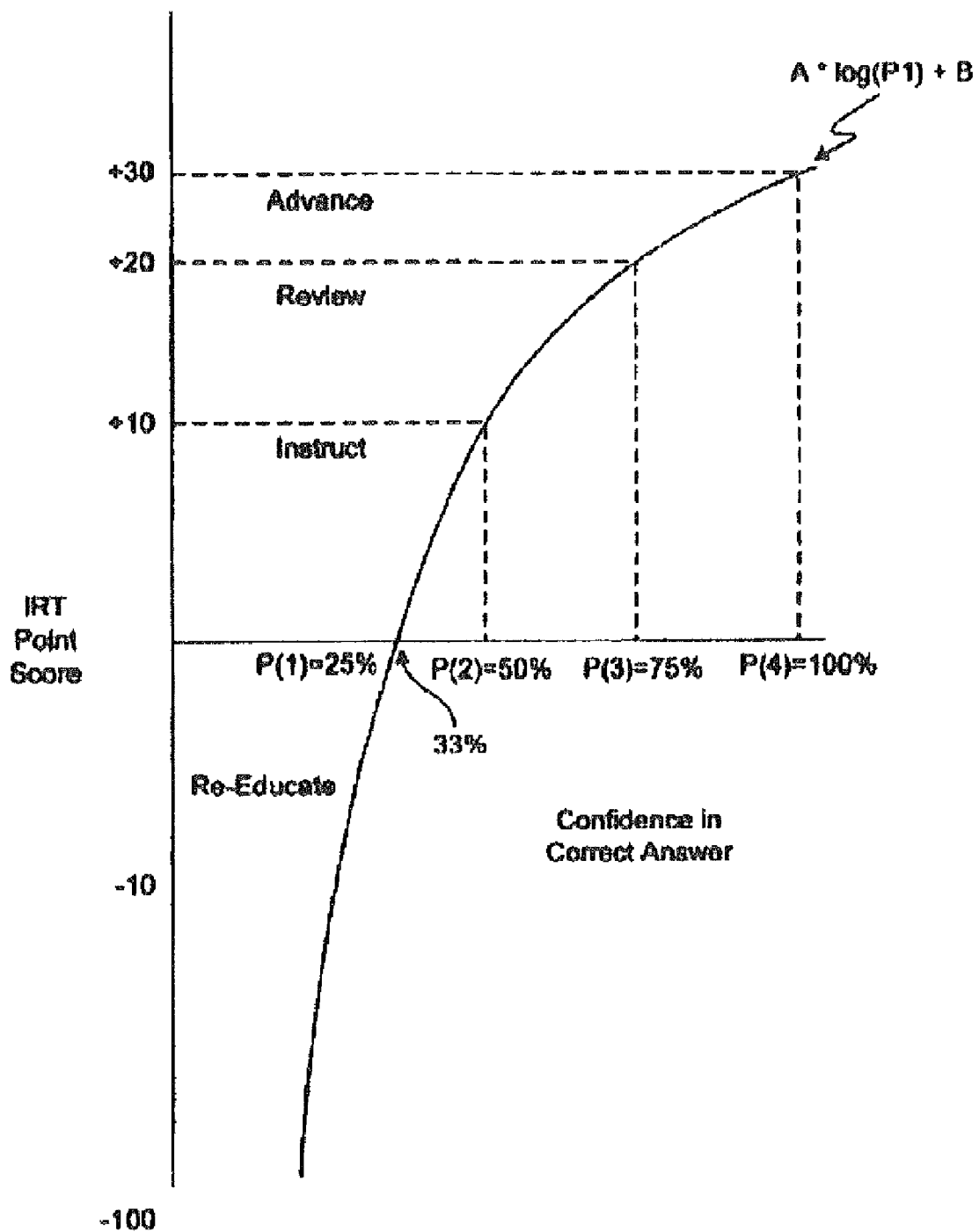
FIG. 11 is a graph that depicts the use of a log function in defining the point scores as a function of the probability that a correct answer will be scored.

The levels of the performance rating can also be mapped unto the log function as shown in FIG. 11 on which decisions for prescribing learning information to the test subjects can be effected as part of the present invention with or without the use of the computer system resources. Thus, a test subject's performance rating of 75%-100% can be considered as having an equivalent confidence level that he or she can provide an informed answer. This level of performance rating would indicate that the test subject possesses an advanced level of the information on which the queries are administered. Thus no compelling need for presenting learning materials to the test subject is indicated. Similarly mapped, a performance level of between 50% to 74% would suggest that the test subject possess accurate information, while review of the substantive information could be considered. For a performance rating between 34% and 49%, a marginal level of the confidence level with which the test subject can provide the correct answer would warrant the retraining of the test subject. Such a marginal level of performance rating would also suggest that the test subject be disqualified from taking the test and that further instruction and/or retraining is necessary. If the performance rating is less than 33%, the test subject should not be considered assigned to the tasks that are information-sensitive and reeducation is required.

As soon as the test has been scored, any or all of the above test subject's feedback 114 is presentable to the test subject or other system users according to permissible levels of information access granted to such individuals. The following illustrates an exemplary presentation of the performance scores:

| Profile | Score |
|---|---|
| No answer | 10% |
| Misinformed | 10% |
| Partially Informed | 20% |
| Fully Informed | 60% |
| Misinformation Gap | |
| The Profile Converted to a score is: | 72% |
| The Self-Confidence Score is: | 86% |
| The Misinformation Gap is: | 14% |

Immediate presentation of the performance scores, as well as the score components, can be made in real-time. Since all results are stored on a database associated with system 8, along with the capability to export data to other database(s) as needed, on-demand retrieval and presentation of results is readily available.

Figure 4:
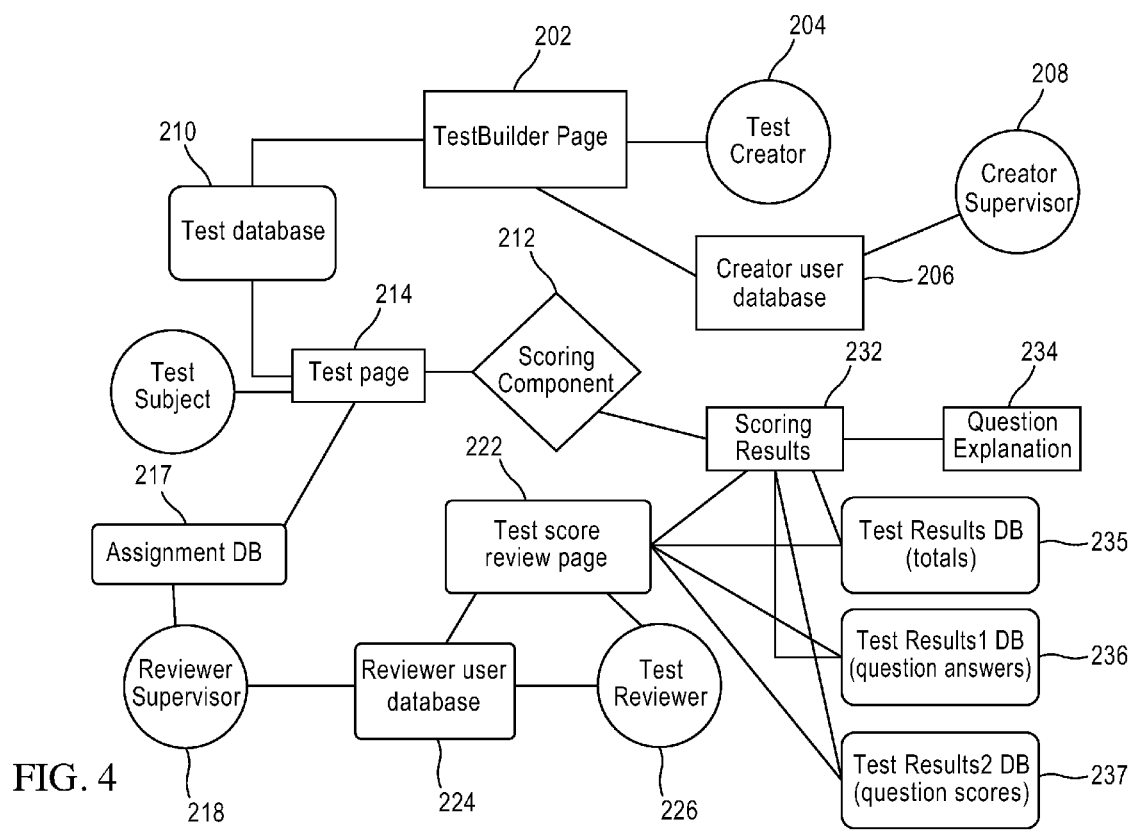
FIG. 4 is a flow diagram showing the network architecture and software solution to provide integrated test authoring, administration, tracking and reporting and associated databases according to aspects of the present invention.

The various tasks of the knowledge assessment and learning system are supported by a network architecture and software solution. FIG. 4 presents a flow diagram, which shows integrated test authoring, administration, tracking and reporting and associated databases of the present invention.

As shown in FIG. 4, in support of test creation, a Test Builder page 202 is initiated by a test creator 204 with proper authentication identified in a creator user database DB 206. Database 206 is managed by creator supervisor 208. The test creator 204 provides content materials for the test queries, which are stored in test database, test DB 210. A test page 214 is created to incorporate test content materials from DB 210 and test assignment instructions from assignment DB 217. Assignment DB 217 includes functions such as administrative controls over the test contents, tests schedules and test subject authentication. Assignment DB 217 is managed and controlled by reviewer supervisor 218.

Test queries are administered via test page 214 to one or more authenticated test subjects 216. As soon as the test has been taken, the results are compiled and passed on to a scoring program module 212 which calculates raw scores 232. The raw scores, as well as other performance data are stored as part of databases 235, 236 and 237. A test reviewer 226 generates a test score review page 222 using test result databases 235, 236, 237. Based on the analysis of the test score review page 222, the reviewer 226 may update the reviewer DB 224. The compiled and scored test results may then be reported immediately to the subjects and the subjects may be provided with their results 235, 236, 237 followed by answers with hyper-linked access to explanations for each question 234.

As described above, it is evident that the present knowledge assessment and learning system exhibits various features and advantageous not present in the prior art. The present invention supports critical decisions as to whether a test subject should be reassigned, trained further, or remained assigned to functions where possession of true knowledge and the use thereof is of primary concern. Further, based on the assessment scores, as well as one or more of the score components, resources pertaining to information acquisition, personnel training, and building of knowledge capital can be effectively allocated and deployed. Such decisions and follow-on actions are supported by quantification of performance and confidence thus providing clarity as part of decision-making.

Further, the present invention provides learning support where resources for learning are allocated based on the quantifiable needs of the test subject as reflected in the knowledge assessment profile, or by other performance measures as presented herein. Thus, the present invention provides a means for the allocation of learning resources according to the extent of true knowledge possessed by the test subject. In contrast to conventional training where a test subject is generally required to repeat an entire course when he or she has failed, the present invention facilitates the allocation of learning resources such as learning materials, instructor and studying time by directing the need of learning, retraining, and reeducation to those substantive areas where the subject is misinformed or uninformed.

This aspect of the invention is effected by the system, which offers or presents a "Personal Training Plan" page to the user. The page displays the queries, sorted and grouped according to various knowledge regions. Each of the grouped queries is hyper-linked to the correct answer and other pertinent substantive information and/or learning materials on which the test subject is queried. Optionally, the questions can also be hyper-linked to online informational references or off-site facilities. Instead of wasting time reviewing all materials encompass the test query, a test subject or user may only have to concentrate on the material pertaining to those areas that require attention or reeducation. Critical information errors can be readily identified and avoided by focusing on areas of misinformation and partial information.

To effect such a function, the assessment profile is mapped or correlated to the informational database and/or substantive learning materials, which is stored in system 8 or at off-system facilities such as resources in the World Wide Web. The links are presented to the test subject for review and/or reeducation.

In addition, the present invention further provides automated cross-referencing of the test queries to the relevant material or matter of interest on which the test queries are formulated. This ability effectively and efficiently facilitates the deployment of training and learning resources to those areas that truly require additional training or reeducation.

Further, with the present invention, any progress associated with retraining and/or reeducation can be readily measured. Following a retaining and/or reeducation, (based on the prior performance results) a test subject could be retested with portions or all of test queries, from which a second knowledge profile can be developed.

In accordance with another aspect, the present invention is a robust method and system for Confidence-Based Assessment ("CBA") and Confidence-Based Learning ("CBL"), in which one answer generates two metrics with regard to the individual's confidence and correctness in his or her response to facilitate an approach for immediate remediation. This is accomplished through three primary tools:

1. A testing and scoring format that completely eliminates the need to guess at answers. This in a more accurate evaluation of "actual" information quality.

2. A scoring method that more accurately reveals what a person: (1) accurately knows; (2) partially knows; (3) doesn't know; and (4) is sure that they know, but is actually incorrect.

3. A resulting knowledge profile that focuses only on those areas that truly require instructional or reeducation attention. This eliminates wasted time and effort training in areas where attention really isn't required.

The foregoing tools are implemented by a five-step method or "learning cycle":

(1) Take an assessment. This begins with the step of compiling a standard three answer ("A", "B", and "C") multiple choice test into a structured CBA format with seven possible answers for each question that cover three states of mind: confidence, doubt, and ignorance, thereby more closely matching the state of mind of the test taker.

(2) Review the knowledge profile—their results qualitatively segmented by quadrant. Given a set of answers the method proceeds to implement a CBA scoring algorithm that gives maximum points for confidently held correct answers, partial points for unsure correct answers, no score for not knowing, and a maximum penalty for wrong answers. Individuals quickly learn that guessing is penalized, and that it is better to admit doubts and ignorance than to feign confidence. The CBA set of answers are then compiled by separating them into quadrants, whereby each set of results is displayed as a knowledge profile made up of a mastery score, a mastery gap (or information gap), and a confidence gap, to more precisely segment answers into meaningful regions of knowledge, giving individuals and organizations rich feedback as to the areas and degrees of mistakes (misinformation), unknowns, doubts and mastery. The knowledge profile is a much better metric of performance and competence, especially in the context of the corporate training environment where it encourages better-informed, higher information quality, employees reducing costly knowledge and information errors, and increasing productivity.

(3) Review the question, answer, and explanation with regard to the material (4) Review the further training links to gain a better understand of the subject material (5) Iteration: Retaking Assessments. The five-step process can be repeated as many times as the individual needs to in order to gain an appropriate understanding of the content.

Each of the method steps is described in greater detail below:

Compiling the CBA Test and Scoring Format

Compiling the present CBA format entails converting a standard multiple choice test comprising three answer ("A", "B", and "C") multiple choice questions into questions answerable by seven options, that cover three states of mind: confidence, doubt, and ignorance.

FIG. 5 is a screen print illustrating the present Question & Answer Format with seven response options, the 'I Don't Know' being the default answer. The exemplary question is "3. The Panama Canal connecting the Atlantic and Pacific oceans generally flows:"? The subject is required to provide two-dimensional answers according to the present invention where the Subject indicates both their answer and level of confidence in their choice. The one-dimensional choices are listed under the question as follows: A. North-South; B. East-West; C. Northeast-Southwest. However, the subject is required to answer by two-dimensional answers, which are categorized under headings "I Am Sure"; "I Am Partially Sure" and "I Don't Know". The "I Am Sure" category includes the three single-choice answers (A-C). The "I Am Partially Sure" category allows the subject to choose between sets of any two single-choice answers (A or B, B or C, A or C). There is also an "I Don't Know" category that includes one specific "I Don' Know" answer which is the default answer. The three-choice seven-answer format is based on research that shows that fewer than three choices introduces error by making it easier to guess at an answer and get it right. More than three choices can cause a level of confusion (remembering previous choices) that negatively impacts the true score of the test. The subject is also presented with scoring information indicating that a wrong "I Am Sure" answer carries a maximum penalty, a right "I Am Sure" answer carries a maximum reward, a wrong "I Am Partially Sure" answer carries a maximum penalty; a right "I Am Partially Sure" answer carries a partial reward, and the "I Don't Know" answer carries no Penalty.

The Subject must carefully answer each question in only one of the three available categories as follows:

100% sure (selects only one answer)

50% certain (select a pair of choices that best represents the answer (A or B) (B or C), or (A or C).

Don't know

This CBA scoring algorithm gives the maximum points for confidently held correct answers, partial points for unsure correct answers, no score for not knowing, and a maximum penalty for wrong answers in any category. Thus, if the Subject is reasonably sure (50% certain) and the correct answer is one of the two choices then partial credit is earned. However, the Subject is heavily penalized for indicating confidence in an incorrect choice. This CBA answer format more closely matches the states that test takers actually think and feel. Overvaluing of information (confidently held misinformation) results in a substantial reduction in the overall score, and subjects quickly learn that guessing is penalized, and that it is better to admit doubt and ignorance than to feign confidence. This encourages test takers to shift their focus from test-taking strategies and trying to inflate scores, toward honest, self-assessment of their actual knowledge and confidence. In fact, the more accurately and honestly individuals self-assess their own knowledge and feelings of confidence, the better their numerical scores.

Compiling the Knowledge Profile from a Set of CBA Answers

Given a set of CBA answers the present method compiles a Knowledge Profile by determining how the answers fit into Knowledge Quadrants indicating regions of knowledge: doubt, misinformation, unknown and mastery.

FIG. 6 is a perspective graphical illustration of the four Knowledge Quadrants indicating confidence and knowledge grid according to the present invention. The Knowledge Quadrants indicate regions of knowledge: doubt, misinformation, unknown and mastery resulting from the subject's answers to the foregoing confidence-based assessment. The graph shows the correctness of the answer (knowledge) along the x-axis and the confidence in the answer along the y-axis. Each of the subject's answers to all of the CBA questions may be plotted into one of the four quadrants as follows:

1. A mistake (a.k.a. "misinformation") is an incorrect answer in either "I'm sure" or "I'm partially sure" categories.

2. An unknown is an "I don't know" answer.

3. A doubt is a correctly answered "I'm partially sure" choice.

4. Mastery is a correctly answered "I'm sure" choice.

After individuals complete a set of CBA test questions as described above, their set of answers are separated into their respective quadrants, and the results are displayed as the Knowledge Profile.

FIG. 7 is a perspective graphical illustration of an exemplary Knowledge Profile indicating quadrant percentages in response to answers, with hyperlinks to Questions & Answers (Q&A). The percentage or score is assigned to each quadrant depending on how the individual did on the assessment. Specifically, the percentage of mistake answers (per total answers) is calculated and displayed as a bar graph, as is the percentage of unknown answers (per total answers), the percentage of doubt answers (per total answers), and the percentage of mastery answers (correct full-confidence answers per total answers). These percentages may be readily derived from the answers and Knowledge Quadrants in which they are plotted in FIG. 6. The Knowledge Profile of FIG. 7 precisely segments answers into meaningful regions of knowledge giving individuals and organizations rich feedback as to the areas and degrees of mistakes, unknowns, doubts and mastery.

The visual and qualitative results from the Knowledge Profile are preferably also converted into numeric scores by which a scoring profile is compiled. The scoring profile is made up of a mastery score and may also include a mastery gap, (sometimes referred to as the information gap), and a confidence gap.

The mastery score is a combination of knowledge and confidence. It is the summation of points from the following algorithm: maximum positive points for surely correct answers, 12 points for partially-sure, correct answers, zero points for uninformed answers, and maximum negative points for wrong sure or partially-sure answers. In addition, the summation must be non-negative (since wrong sure or partially-sure answers are computed as a negative, there is a potential for negative scores). The mastery score must be non-negative (greater than or equal to zero) and if not, the summation is adjusted to zero.

The mastery gap is the difference between a perfect mastery score (100) and the actual mastery score.

The confidence gap is the appropriateness of confidence relative to the knowledge demonstrated. A positive confidence gap means a person is relatively overconfident, while a negative confidence gap means a person is relatively under confident.

The scoring profile inclusive of mastery score and mastery gap affords a much greater precision Confidence-Based Assessment. They reflect the distinctions among knowing, guessing, not knowing, and believing one knows, distinctions which have significant real-world implications that affect individual and organizational competence, performance and risks. These distinctions are undetectable in binary, right-or-wrong test results. With the present method when individuals see misinformation/mistakes in their knowledge profiles as in FIG. 7, they are surprised. Surprise creates a teachable moment, where the mind is more receptive to feedback and new information.

This leads to the next step, which is remediation.

Remediation

To improve learning, it is important to provide specific learning materials, immediately, when the learner is ready for them. This entails a targeted learning plan (or "Personal Learning Plan"), where learners see all the questions sorted by knowledge quadrants.

FIG. 8 is a screen print of an exemplary remediation presentation, which is delivered immediately when the subject chooses a hyperlink to Questions & Answers (Q&A) as seen in FIG. 7. For each question, the subjects can see the question, their answer, the correct answer, and an explanation. For example, for the illustrated question a complete explanation is given for the correct answer: "Panama Canal joining the Atlantic and Pacific oceans across the Isthmus of Panama, Running from Cristobal on Limon Bay, an arm of the Caribbean Sea, to Balboa, on the Gulls of Panama, the canal is slightly more than 64 km (40 mi) long, not including the dredged approach channels at either end. The minimum depth is 12.5 m (41 ft), and the minimum width is 91.5 m (300 ft). The construction of the Panama Canal ranks as one of the greatest engineering works of all time." In addition, further links are provided to related learning materials, such as "To learn more about Panama Canal", and "see the picture of Panama Canal". The links are also to documents, courses, books, other locations the internet or other database information that will help the individual better understand the material. This form of remediation reminds the subject to let their curiosity take control and have fun learning.

Increasing Retention by Iteration

Confidence is highly correlated with knowledge retention. As stated above, the present method asks learners their level of confidence, and measures confidence. However, it moves further by moving subjects to full confidence in their answers in order to reach true knowledge, thereby increasing knowledge retention. This is accomplished by an iteration step. After individuals review the results of the material in CBA as above, learners can retake the assessment, as many times as necessary to reach true knowledge. This yields multiple Knowledge Profiles which help individuals understand and measure their improvement throughout the assessment process.

When an individual retakes an assessment, the questions are randomized using a random number generator, such that individuals do not see the same questions in the same order from the previous assessment. Questions are developed in a database in which there is a certain set of questions to cover a subject area. To provide true knowledge acquisition and testing of the material, a certain number of questions are presented each time rather than the full bank of questions. This allows the individuals to develop and improve with their understanding of the material over time.

Figure 9:
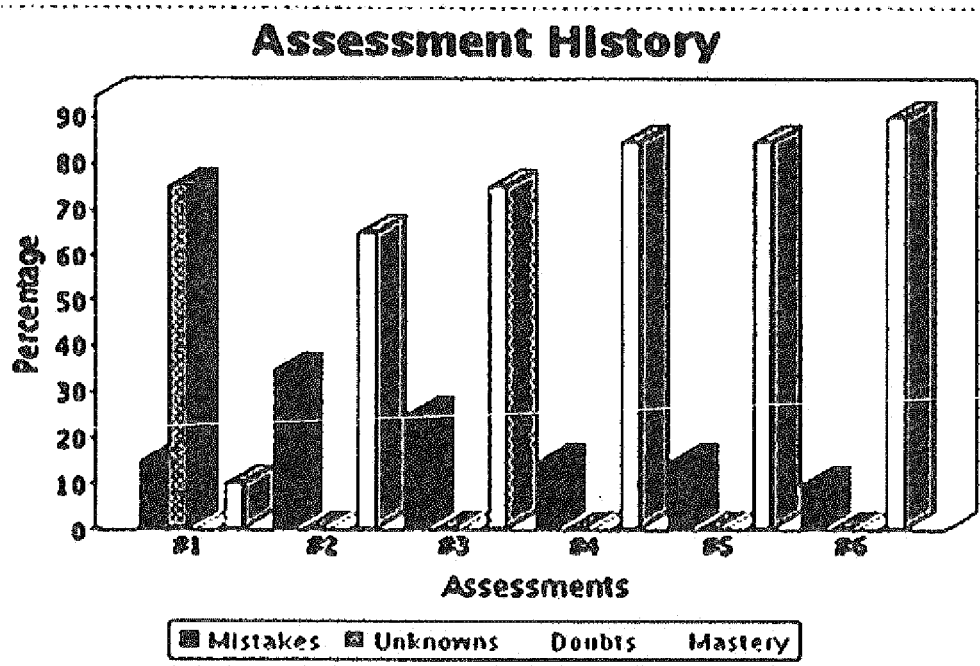
FIG. 9 is a graphical illustration of how multiple Knowledge Profiles are compiled and displayed to allow individuals to measure their improvement.

FIG. 9 is a graphical illustration of how multiple Knowledge Profiles are compiled and displayed to allow individuals to measure their improvement. In this display, the individual can review and determine how well they are doing in each knowledge quadrant and how they are improving. The assessment history provides the individual with a metric to determine both improvements in confidence and knowledge.

In addition to the foregoing, the individual can be measured on how long it takes to answer a question as well as how long it takes to complete to an assessment. These metrics both may be used as an indicator of mastery.

Figure 10:
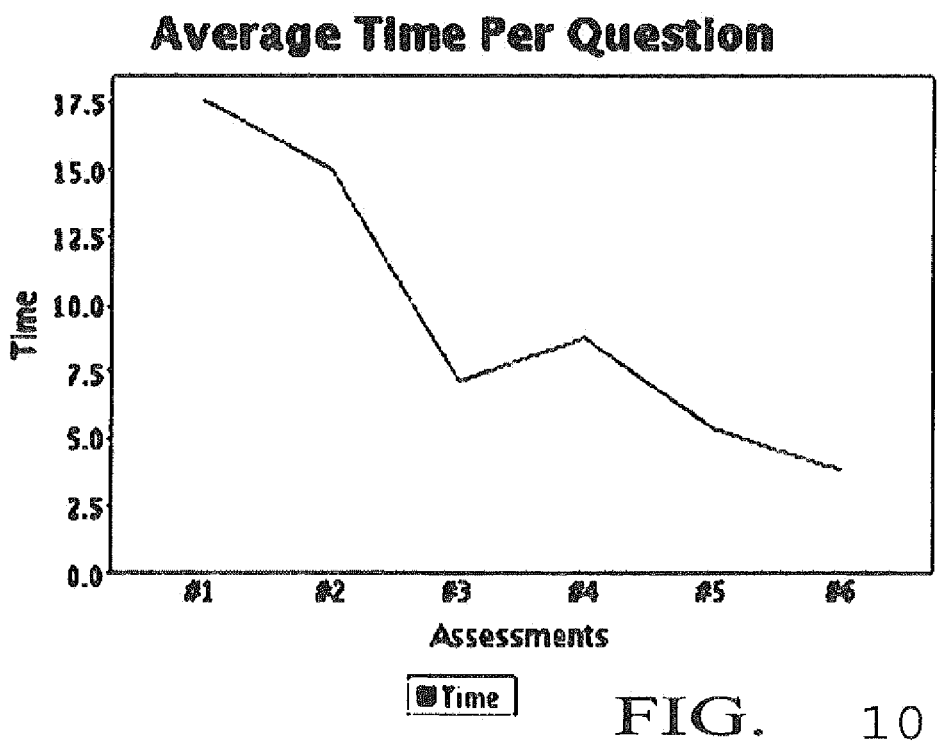
FIG. 10 is a graphical illustration of time metrics, e.g., a diagram indicating the average time per question.

FIG. 10 is a graphical illustration of time metrics, e.g., a diagram indicating the average time per question. As shown in FIG. 10, the diagram indicates the average time per question. The length in time it takes to answer a question and complete an assessment is a good indicator of mastery. The more confident an individual is, the less time it will take. The less time it takes, the more ingrained the knowledge.

Industry Applications

1. Certification

The confidence-based assessment can be used as a confidence-based certification instrument. In this instance, the confidence-based certification process would not provide any remediation but only provide a score and/or knowledge profile. The confidence-based assessment would indicate whether the individual had any confidently held misinformation in any of the certification material being presented. This would also provide, to a certification body, the option of prohibiting certification where misinformation exists within a given subject area. Since the CBA method is more precise then current one-dimensional testing, confidence-based certification increases the reliability of certification testing and the validity of certification awards.

2. Adaptive Learning

The confidence-based assessment can apply to adaptive learning approaches in which one answer generates two metrics with regard to confidence and knowledge. In adaptive learning, the use of video or scenarios to describe a situation helps the individual work through a decision making process that supports their learning and understanding. In adaptive learning techniques, individuals repeat the process a number of times to develop familiarity with how they would handle a given situation. For scenarios or simulations, CBA and CBL adds a new dimension to how confident individuals are in their decision process. The use of the confidence-based assessment using an adaptive learning approach enables individuals to identify where they are uninformed and have doubts in their performance and behavior. Repeating adaptive learning until individuals become fully confident increases the likelihood that the individuals will act rapidly and consistently with their training. CBA and CBL are also 'adaptive' in that each user interacts with the assessment and learning based on his her own learning aptitude and prior knowledge, and the learning will therefore be highly personalized to each user.

3. Survey

The confidence-based assessment can be applied as a confidence-based survey instrument, which incorporates the choice of three possible answers, in which individuals indicate their confidence in and opinion on a topic. As before, individuals select an answer response from seven options to determine their confidence and understanding in a given topic or their understanding of a particular point of view. The question format would be related to attributes or comparative analysis with a product or service area in which both understanding and confidence information is solicited. For example, a marketing firm might ask, "Which of the following is the best location to display a new potato chip product? A) at the checkout; B) with other snack products; C) at the end of an aisle." The marketer is not only interested in the consumer's choice, but the consumer's confidence or doubt in the choice. Adding the confidence dimension increases a person's engagement in answering survey questions and gives the marketer richer and more precise survey results.

In all the foregoing applications, the present method gives more accurate measurement of knowledge and information. Individuals learn that guessing is penalized, and that it is better to admit doubts and ignorance than to feign confidence. They shift their focus from test-taking strategies and trying to inflate scores toward honest self-assessment of their actual knowledge and confidence. This gives subjects as well as organizations rich feedback as to the areas and degrees of mistakes, unknowns, doubts and mastery. Having now fully set forth the preferred embodiments and certain modifications of the concept underlying the present invention, various other embodiments as well as certain variations and modifications of the embodiments herein shown and described will obviously occur to those skilled in the art upon becoming familiar with the underlying concept. It is to be understood, therefore, that the invention may be practiced otherwise than as specifically set forth herein.

What is claimed is:

1. A system for knowledge assessment and encouraging learning, comprising:
a test terminal for displaying to a test subject a plurality of multiple choice questions and two-dimensional answers thereto;
an input device for allowing the test subject to select of one or more of the answers, the test terminal adapted to transmit information via a communications network:
a courseware server adapted to communicate via the communications network
a electronic database of learning materials, wherein the plurality of multiple choice questions and two-dimensional answers thereto are stored in the database for selected delivery to the test terminal, the system for knowledge assessment further performing a method of, transmitting via the communications network to the test terminal the plurality of multiple choice questions and two-dimensional answers thereto, the answers including a plurality of full-confidence answers consisting of single-choice answers, a plurality of partial-confidence answers consisting of sets of multiple single-choice answers, and an unsure answer;
administering a confidence-based assessment (CBA) test further comprising presenting to the test subject via the test terminal the plurality of multiple choice questions directed to categorical topics, and the two-dimensional answers thereto, and receiving via the test terminal the test subject's selected answer to the multiple choice questions by which the test subject indicates both their substantive answer and the level of confidence category of their answer;
transmitting via the communications network the test subject's selected answers to the multiple choice questions to the courseware server;
scoring the CBA test by giving maximum points for correct full-confidence answers, partial points for correct partial-confidence answers, no score for not knowing, and a maximum penalty for wrong answers in any category;
compiling a knowledge profile from the scored CBA test comprising a graphical illustration arranged with correctness of the answer along a first axis and confidence in the answer along a second axis, with the two dimensional answers plotted thereon and separated into a first area of doubt, a second area of misinformation, a third area of unknown and a fourth area of mastery, the knowledge profile additionally including a scoring profile indicating percentage of answers assigned to each area;
displaying the knowledge profile to the test subject;
encouraging remedial learning by the test subject by, in association with displaying the knowledge profile to the subject, also displaying all of the multiple choice questions to the subject along with the subject's answer, a correct answer, an explanation, and references to related learning materials for the questions;
re-administering the confidence-based assessment (CBA) test with a plurality of different multiple choice questions related to the categorical topics;
scoring the re-administered CBA test by giving maximum points for correct full confidence answers, partial points for correct partial-confidence answers, no score for not knowing, and a maximum penalty for wrong answers in any category;
compiling and displaying a composite knowledge profile to the subject from the administered and re-administered CBA tests.

2. The system for knowledge assessment and encouraging learning according to claim 1, wherein re-administering the CBA test, scoring the re-administered CBA test, and compiling and displaying a composite knowledge profile are repeated a plurality of times to encourage knowledge retention by iteration.

3. The system for knowledge assessment and encouraging learning according to claim 1, wherein the two-dimensional answers generate a metric of confidence and a metric of correctness.

4. The system for knowledge assessment and encouraging learning according to claim 3, wherein administering a confidence-based assessment (CBA) test further comprises a plurality of multiple choice questions directed to categorical topics, each having three full confidence single-choice answers, three partial-confidence choices consisting of sets of the multiple single-choice answers, and an unsure answer.

5. The system for knowledge assessment and encouraging learning according to claim 4, wherein the full-confidence choices are displayed in a grouping labeled "I AM SURE", the partial confidence choices are displayed in a grouping labeled "I AM PARTIALLY SURE" and the unsure answer is displayed in a grouping labeled "I DON'T KNOW".

6. The system for knowledge assessment and encouraging learning according to claim 4, wherein failure to answer is interpreted as a default unsure answer.

7. The system for knowledge assessment and encouraging learning according to claim 6, wherein the second area is named and displayed as either "misinformed" or "mistakes"; the third area is named and displayed as either "uninformed" or "unknowns"; the second area is named and displayed as either "partially informed" or "doubts"; and the fourth area is named and displayed as either "fully informed" "true knowledge" or "mastery".

8. The system for knowledge assessment and encouraging learning according to claim 7, wherein any answer to anyone of the multiple choice questions may be plotted in one of the four areas as follows:
an answer wherein the correctness of the answer is incorrect and the confidence in the answer is a mistake is either "I'm sure" or "I'm partially sure" is plotted in the second area;
an answer indicating an "I don't know" reply is plotted in the third area;
an answer wherein the correctness of the answer is correct and the confidence in the answer is "I'm partially sure" is plotted in the first area; and
an answer wherein the correctness of the answer is correct and the confidence in the answer is "I'm sure" is plotted in the fourth area.

9. The system for knowledge assessment and encouraging learning according to claim 1, wherein compiling and displaying a knowledge profile to the subject further comprises displaying a numerical scoring profile in which qualitative results from the areas are converted into numeric scores including a mastery score, mastery gap, and confidence gap.

10. The system for knowledge assessment and encouraging learning according to claim 9, wherein the mastery score comprises a summation of maximum positive points for surely correct answers, ½ points for partially-sure, correct answers, zero points for uninformed answers, and maximum negative points for wrong sure or partially-sure answers.

11. The system for knowledge assessment and encouraging learning according to claim 9, wherein the mastery gap comprises the difference between a perfect mastery score and the actual mastery score.

12. The system for knowledge assessment and encouraging learning according to claim 11, wherein the confidence gap comprises the appropriateness of confidence relative to the knowledge demonstrated.

13. The system for knowledge assessment and encouraging learning according to claim 1, wherein encouraging remedial learning comprises displaying hyperlinks to electronic databases of related learning materials.

14. The system for knowledge assessment and encouraging learning according to claim 1, wherein re-administering the confidence-based assessment (CBA) test with a plurality of different multiple choice questions related to the categorical topics comprises random questions selected by topic using a random number generator, so that individuals do not see the same questions in the same order from the previous assessment.

15. The system for knowledge assessment and encouraging learning according to claim 1, wherein compiling and displaying a knowledge profile to the subject further comprises measuring how long it takes the subject to answer a question as well as how long it takes to complete to an assessment, both as an indicator of mastery.

16. An electronic system for knowledge assessment, comprising:
   a courseware server adapted to communicate with a test subject via a communications network
   a electronic database of learning materials, the database including a plurality of multiple choice questions and two-dimensional answers for selected delivery to the test subject, the system for knowledge assessment further performing a method of:
   displaying to the test subject the plurality of multiple choice questions and two-dimensional answers thereto;
   prompting the test subject to select of one or more of the answers;
   transmitting the plurality of multiple choice questions and two-dimensional answers thereto derived from the database of learning materials to the test subject, wherein the answers include a plurality of full-confidence answers consisting of single-choice answers, a plurality of partial-confidence answers consisting of sets of multiple single-choice answers, and an unsure answer;
   administering a confidence-based assessment (CBA) test further comprising
      presenting to the test subject the plurality of multiple choice questions directed to categorical topics, and the two-dimensional answers thereto, and
      receiving via an input device in communication with the terminal the test subject's selected answer to the multiple choice questions by which the test subject indicates both their substantive answer and the level of confidence category of their answer,
      transmitting the test subject's selected answers to the multiple choice questions to the courseware server;
   scoring the CBA test by giving maximum points for correct full-confidence answers, partial points for correct partial-confidence answers, no score for not knowing, and a maximum penalty for wrong answers in any category;
   compiling a knowledge profile to the subject from the scored CBA test comprising a graphical illustration arranged with correctness of the answer along a first axis and confidence in the answer along a second axis, with the two-dimensional answers plotted thereon and separated into at least one of a first area of doubt, a second area of misinformation, a third area of unknown and a fourth area of mastery, the knowledge profile additionally including a scoring profile indicating percentage of answers assigned to each of the areas;
   displaying the knowledge profile to the test subject via the terminal;
   encouraging remedial learning by the test subject by, in association with displaying the knowledge profile to the subject, also displaying all of the multiple choice questions to the subject along with the subject's answer, a correct answer, an explanation, and references to related learning materials for the questions.

17. The electronic system for knowledge assessment according to claim 16, wherein administering a confidence-based assessment (CBA) test further comprises a plurality of multiple choice questions directed to categorical topics, each having three full-confidence single-choice answers, three partial-confidence choices consisting of sets of the multiple single-choice answers, and an unsure answer.

18. The electronic system for knowledge assessment according to claim 17, wherein the full-confidence choices are displayed in a first grouping, the partial confidence choices are displayed in a second grouping, and the unsure answer is displayed in a third grouping.

19. The electronic system for knowledge assessment according to claim 18, wherein the first grouping corresponds to an "I'm sure" answer, the second grouping corresponds to an "I'm partially sure" answer and the third grouping corresponds to an "I don't know" answer.

20. The electronic system for knowledge assessment according to claim 19, wherein any answer to any one of the multiple choice questions may be plotted in one of the four areas as follows:
   an answer wherein the correctness of the answer is incorrect and the confidence in the answer is a either "I'm sure" or "I'm partially sure" is plotted in the second area;
   an answer indicating an "I don't know" reply is plotted in the third area;
   an answer wherein the correctness of the answer is correct and the confidence in the answer is "I'm partially sure" is plotted in the first area; and
   an answer wherein the correctness of the answer is correct and the confidence in the answer is mastery is "I'm sure" is plotted in the fourth area.

* * * * *